United States Patent
Greenwood et al.

(10) Patent No.: US 9,434,278 B2
(45) Date of Patent: Sep. 6, 2016

(54) WALL RAIL PLATFORM AND RELEASE SYSTEM

(71) Applicant: Black Mountain Industries, Inc., Bryan, TX (US)

(72) Inventors: Kyle L. Greenwood, Bryan, TX (US); Rattaya C. Yalamanchili, Houston, TX (US); James Buckner, Bryan, TX (US)

(73) Assignee: Black Mountain Industries, Inc., Bryan, TX (US)

(*) Notice: Subject to any disclaimer, the term of this patent is extended or adjusted under 35 U.S.C. 154(b) by 24 days.

(21) Appl. No.: 13/898,113

(22) Filed: May 20, 2013

(65) Prior Publication Data

US 2013/0307306 A1    Nov. 21, 2013

Related U.S. Application Data

(60) Provisional application No. 61/648,661, filed on May 18, 2012.

(51) Int. Cl.
| | |
|---|---|
| *B60N 2/42* | (2006.01) |
| *B60N 2/16* | (2006.01) |
| *B60N 3/06* | (2006.01) |
| *B60N 2/24* | (2006.01) |

(52) U.S. Cl.
CPC . *B60N 2/16* (2013.01); *B60N 2/24* (2013.01); *B60N 2/4242* (2013.01); *B60N 3/063* (2013.01)

(58) Field of Classification Search
CPC ........ B60N 2/16; B60N 2/24; B60N 2/4242; B60N 3/063
USPC ........ 297/344.12, 344.13, 344.18, 465, 474, 297/475, 486
See application file for complete search history.

(56) References Cited

U.S. PATENT DOCUMENTS

| | | | | |
|---|---|---|---|---|
| 3,625,563 | A * | 12/1971 | Dickinson et al. | 297/333 |
| 3,868,143 | A * | 2/1975 | Reilly | 297/216.17 |
| 3,954,041 | A * | 5/1976 | Mechulam et al. | 89/36.13 |
| 4,474,347 | A * | 10/1984 | Mazelsky | 244/122 R |
| 4,555,138 | A * | 11/1985 | Hughes | 297/344.13 |
| 6,224,154 | B1 * | 5/2001 | Stoki | 297/339 |
| 6,446,758 | B1 * | 9/2002 | Schatz | 187/222 |
| 6,997,511 | B2 * | 2/2006 | Marchand et al. | 297/314 |
| 7,100,991 | B2 * | 9/2006 | Schroth | 297/468 |
| 7,413,247 | B2 * | 8/2008 | Van Druff et al. | 297/216.17 |
| 7,914,078 | B2 | 3/2011 | Hentges | |
| 9,238,423 | B2 * | 1/2016 | Greenwood | B60N 2/16 |
| 2011/0285184 | A1 | 11/2011 | Greenwood | |

OTHER PUBLICATIONS

International Search Report and Written Opinion for International Search Report PCT/US2013/041869 dated Oct. 31, 2013.

\* cited by examiner

*Primary Examiner* — Philip Gabler
(74) *Attorney, Agent, or Firm* — Tumey L.L.P.

(57) ABSTRACT

A system and method allow for a platform to be collapsed and moved in a vehicle. In one embodiment, a wall rail platform system disposed in a vehicle includes a collapsible platform. The collapsible platform has a position, which is a collapsed position or an un-collapsed position. The system also includes a rail and a carriage. The carriage is attached to the collapsible platform. The carriage is vertically moveable along the rail. The system further includes a soldier restraint system having a seat assembly and a single point release system.

19 Claims, 27 Drawing Sheets

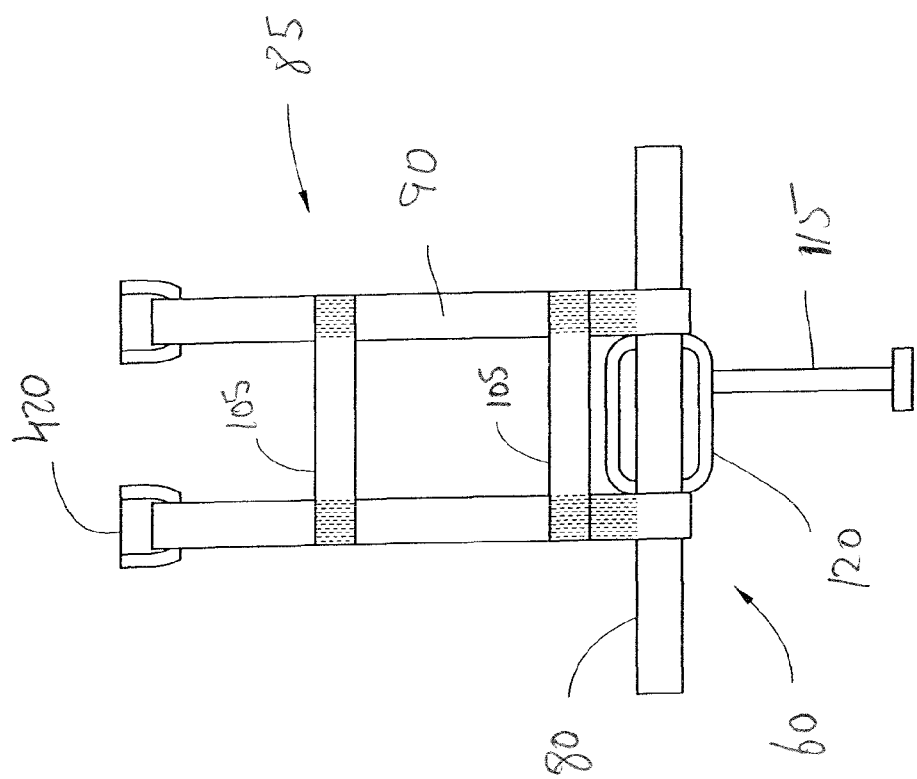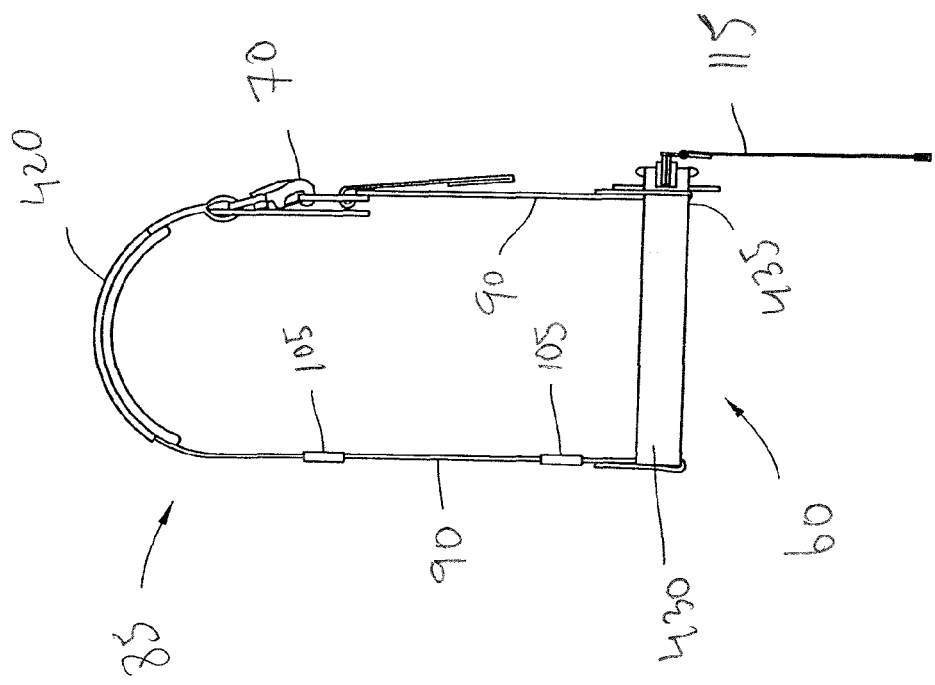

WALL RAIL PLATFORM AND RELEASE SYSTEM

CROSS-REFERENCE TO RELATED APPLICATIONS

This application is a non-provisional of U.S. Application Ser. No. 61/648,661 filed May 18, 2012, which is herein incorporated by reference in its entirety.

STATEMENT REGARDING FEDERALLY SPONSORED RESEARCH OR DEVELOPMENT

Not applicable.

BACKGROUND OF THE INVENTION

1. Field of the Invention

This invention relates to the field of vehicle occupant support systems and more specifically to soldier support systems in a vehicle.

2. Background of the Invention

Occupants of vehicles often need to be in an elevated position within the vehicle. For instance, in military vehicles, occupants of the military vehicles may need to expose the upper portion of the occupants' bodies outside of the vehicle. Such instances include the need to operate weaponry, improve vision outside of the military vehicle, and the like. Problems occur in such situations with fatigue involved with the individuals having to stand in such positions for long periods of time. Further problems include securing the occupant inside the vehicle during motion of the vehicle and also during a vehicle roll over to prevent injury of the occupant.

Platforms have been developed on which the occupants may stand to overcome some of such drawbacks. However, such platforms have drawbacks, which include inefficient use of space in the vehicle when the platform is not being used. Further drawbacks include inefficient placement or inability to adjust the location of the platforms within the vehicle.

Consequently, there is a need for a system to protect soldiers in a vehicle. Additional needs include a system to support soldiers in a vehicle but that also optimizes use of available space in the vehicle.

BRIEF SUMMARY OF SOME OF THE PREFERRED EMBODIMENTS

These and other needs in the art are addressed in one embodiment by a wall rail platform system disposed in a vehicle. The system includes a collapsible platform. The collapsible platform includes a position. The position includes a collapsed position or an un-collapsed position. The system also includes a rail and a carriage. The carriage is attached to the collapsible platform, and the carriage is vertically moveable along the rail. The system further includes a soldier restraint system having a seat assembly and a single point release system.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which:

FIG. 26 illustrates a side view of a restraint harness belt and a shoulder harness;

FIG. 27 illustrates a back view of a restraint harness belt and a shoulder harness;

DETAILED DESCRIPTION OF THE PREFERRED EMBODIMENTS

Figure 1:
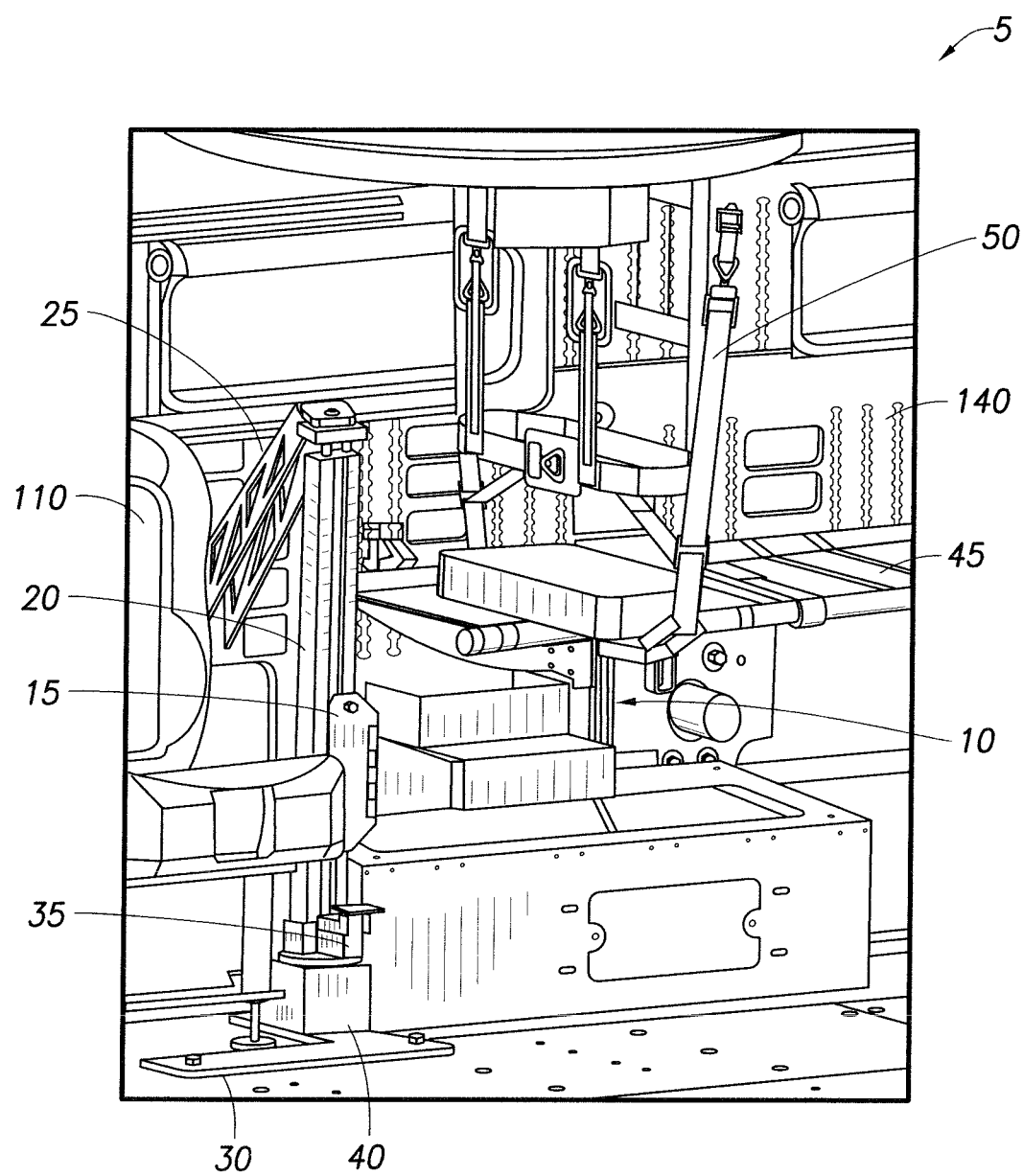
FIG. 1 illustrates a perspective view of an embodiment of a wall rail platform system having a collapsible platform.
Figure 2:
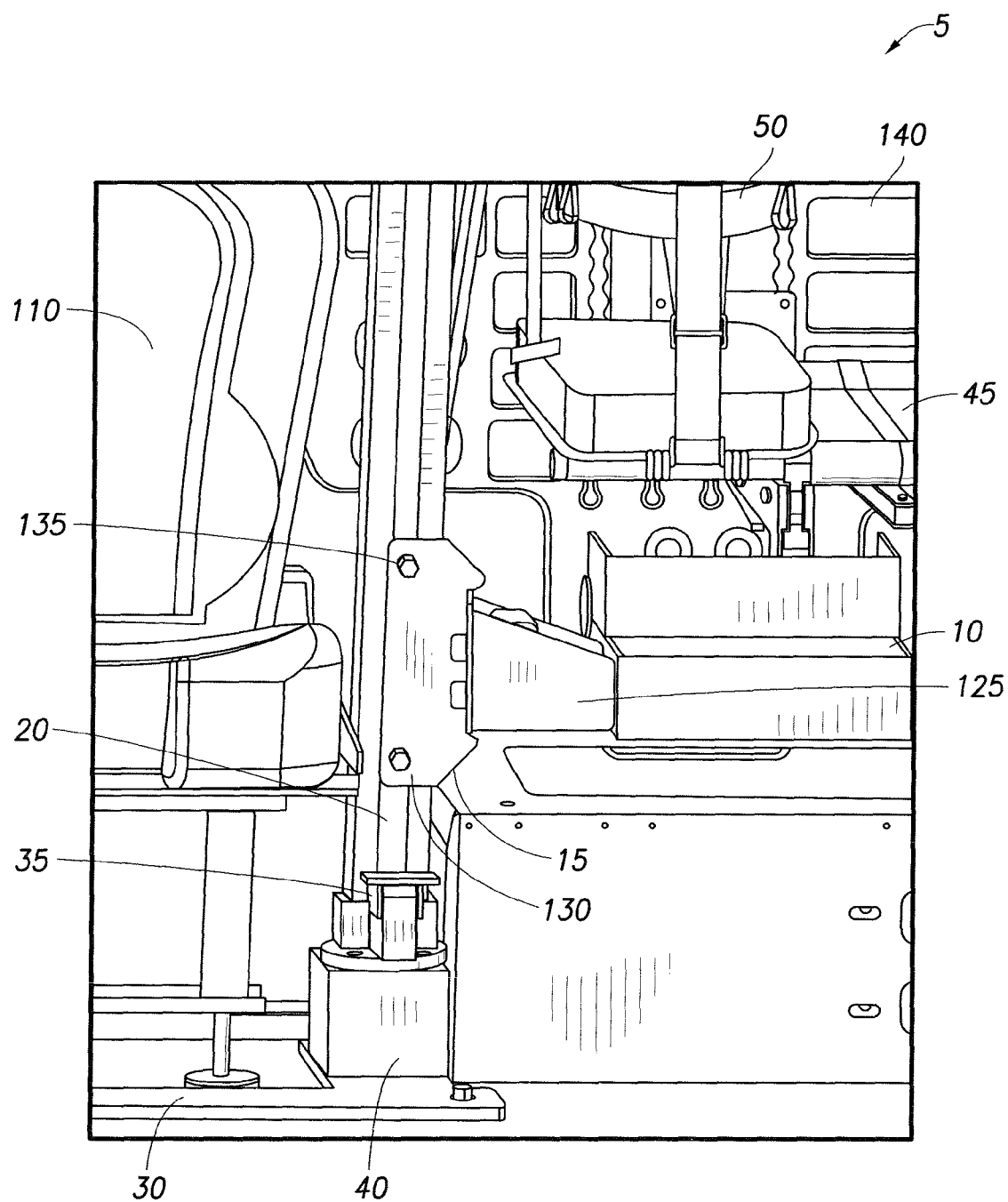
FIG. 2 illustrates another perspective view of an embodiment of a wall rail platform system having a collapsible platform.
Figure 3:
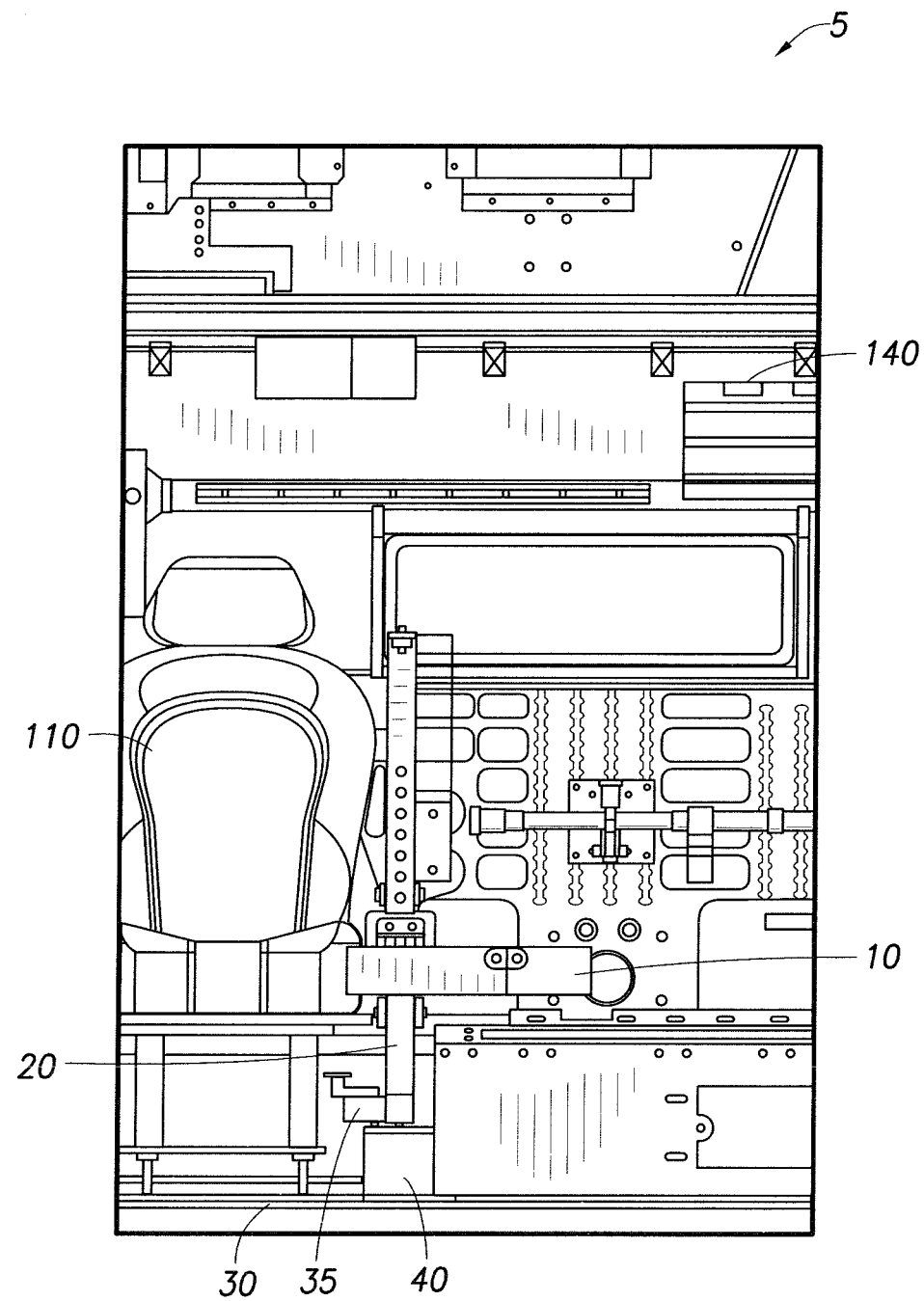
FIG. 3 illustrates a front view of an embodiment of a wall rail platform system having a collapsible platform in a lower position.
Figure 4:
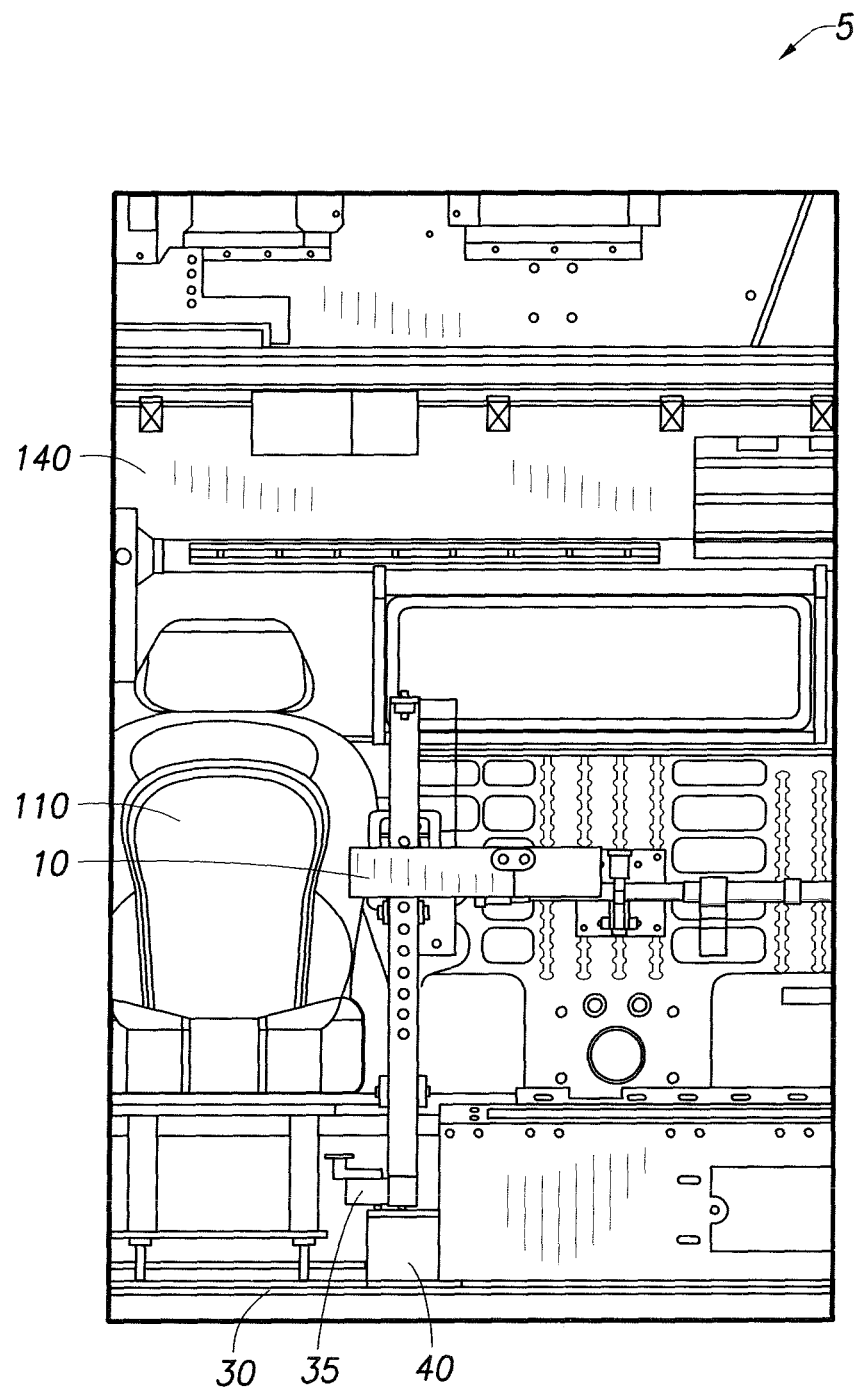
FIG. 4 illustrates a front view of an embodiment of a wall rail platform system having a collapsible platform in an upper position.
Figure 17:
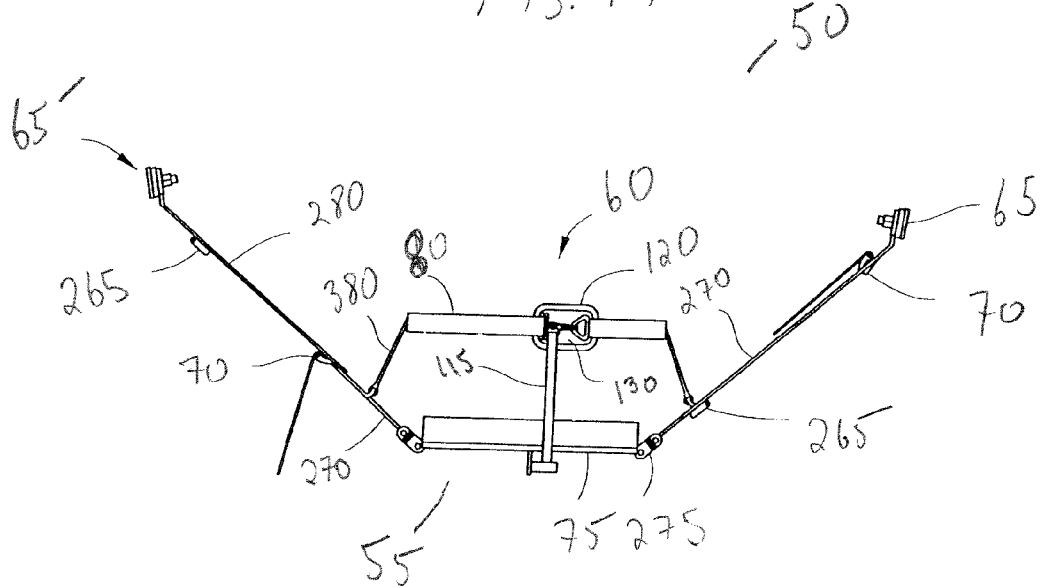
FIG. 17 illustrates a front view of a soldier restraint system having a seat assembly and a restraint harness belt.

FIGS. 1 and 2 illustrate an embodiment of wall rail platform system 5 having collapsible platform 10, carriage 15, rail 20, and wall mounting 25, floor mounting 30, foot pedal 35, and energy attenuation box 40. In an embodiment, collapsible platform 10 when in an un-collapsed position provides a surface for an individual (i.e., gunner) to stand upon and thereby supports the individual's weight. In embodiments, collapsible platform 10 is collapsible and laterally and vertically moveable, which, without limitation, may optimize use of available space within the vehicle. FIGS. 3 and 4 illustrate collapsible platform 10 in a lower vertical position (FIG. 3) and in an upper vertical position (FIG. 4). In some embodiments as shown in FIGS. 1 and 2, wall rail platform system 5 provides collapsible platform 10 with a means for securing the individual. In an embodiment as shown in FIG. 17, the means for securing the individual includes soldier restraint system 50.

As shown in FIGS. 1 and 2, wall rail platform system 5 has collapsible platform 10 attached to carriage 15. Carriage 15 is vertically moveable up and down to different vertical positions. Vertical movement of carriage 15 therefore also causes the corresponding vertical movement of collapsible platform 10 to desired vertical positions along rail 20. In embodiments, rail 20 is laterally rotatable, which correspondingly provides lateral rotation of carriage 15 and therefore collapsible platform 10. Collapsible platform 10 may then be rotated to a plurality of desired lateral positions.

FIGS. 1 and 2 illustrate an embodiment of wall rail platform system 5 in which collapsible platform 10 is in a collapsed position and also in a stowed position. In embodiments as shown, collapsible platform 10 is disposed at a vertical position lower than litter rack 45. In such embodiments, collapsible platform 10 is also disposed at a lateral position beneath litter rack 45.

Figure 5:
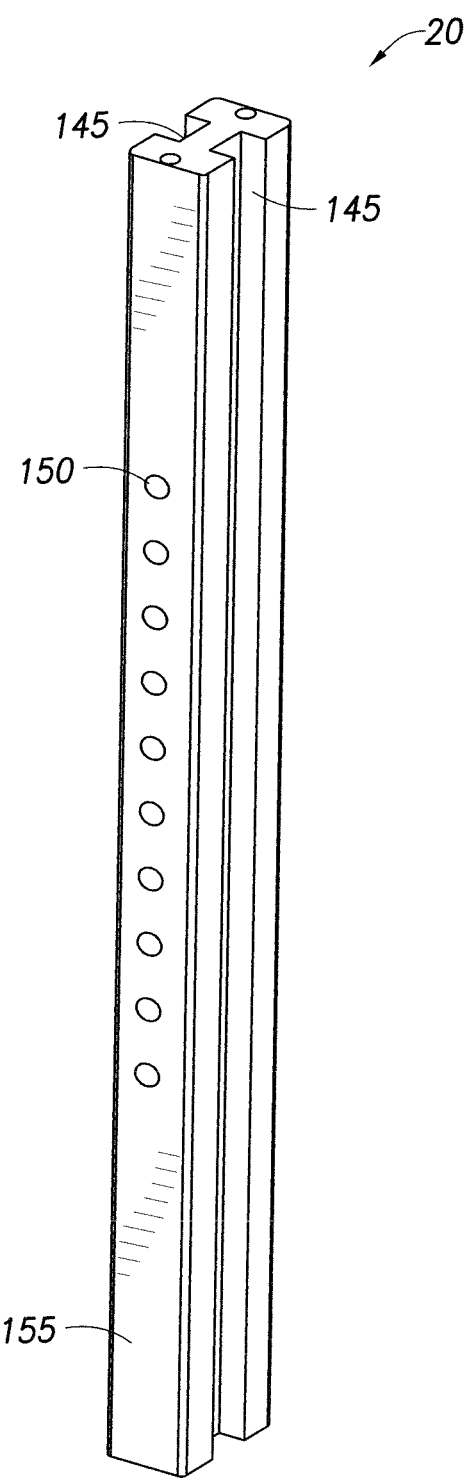
FIG. 5 illustrates a perspective view of an embodiment of a rail.

FIG. 5 illustrates an embodiment of rail 20. Rail 20 has rail body 155. Rail body 155 may be composed of any material suitable for use in a military vehicle such as metal, plastic, ceramic, or any combinations thereof. Rail 20 includes roller guides 145. In embodiments as shown, roller guides 145 are disposed on opposing sides of rail body 155. In embodiments, roller guides 145 extend lengthwise along rail body 155 and comprise a groove extending lengthwise of rail body 155. On a side of rail body 155 disposed between the sides of rail body 155 having roller guides 145, rail body 155 has mounts 150. Mounts 150 comprise recesses into rail body 155. In embodiments, mounts 150 are sufficient to allow a pin (i.e., release pins 170) to be inserted therein. In embodiments as shown, mounts 150 are disposed in a row that extends vertically.

Figure 6:
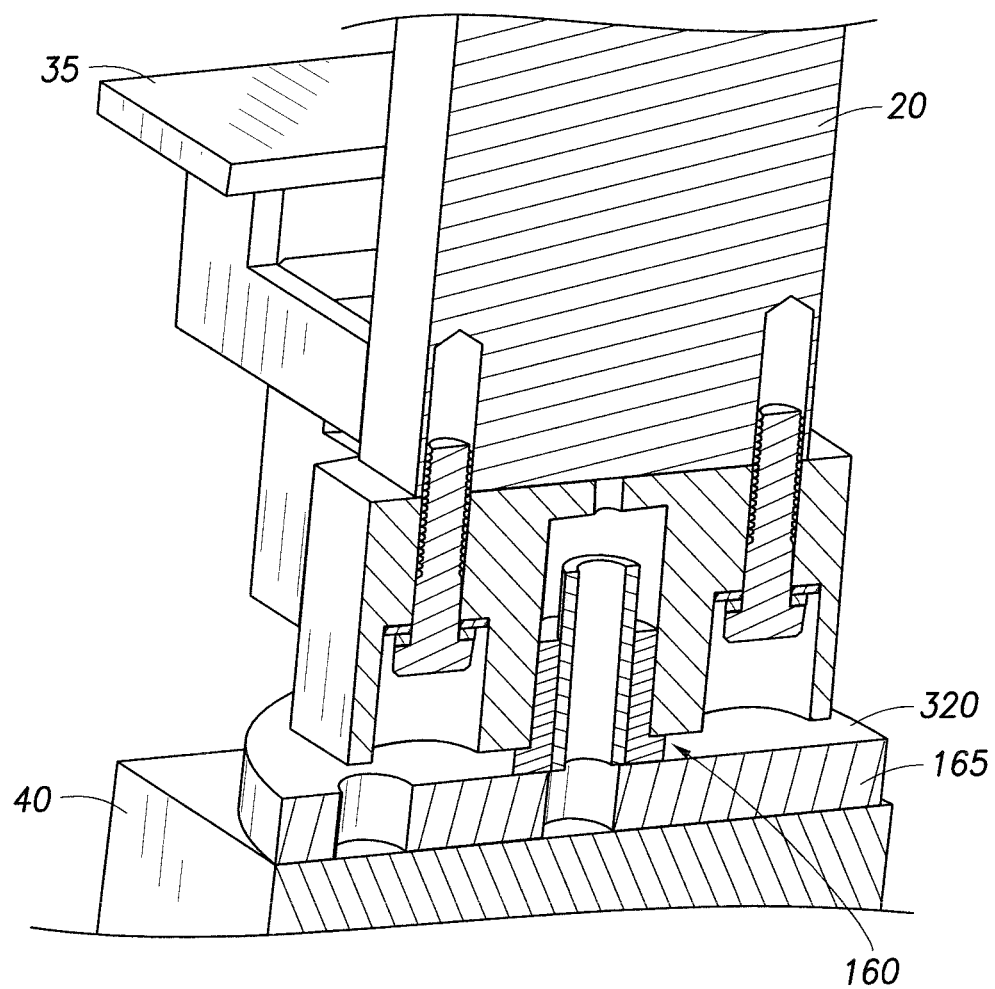
FIG. 6 illustrates a perspective cross sectional view of an embodiment of a foot pedal and rail with a bushing.
Figure 7:
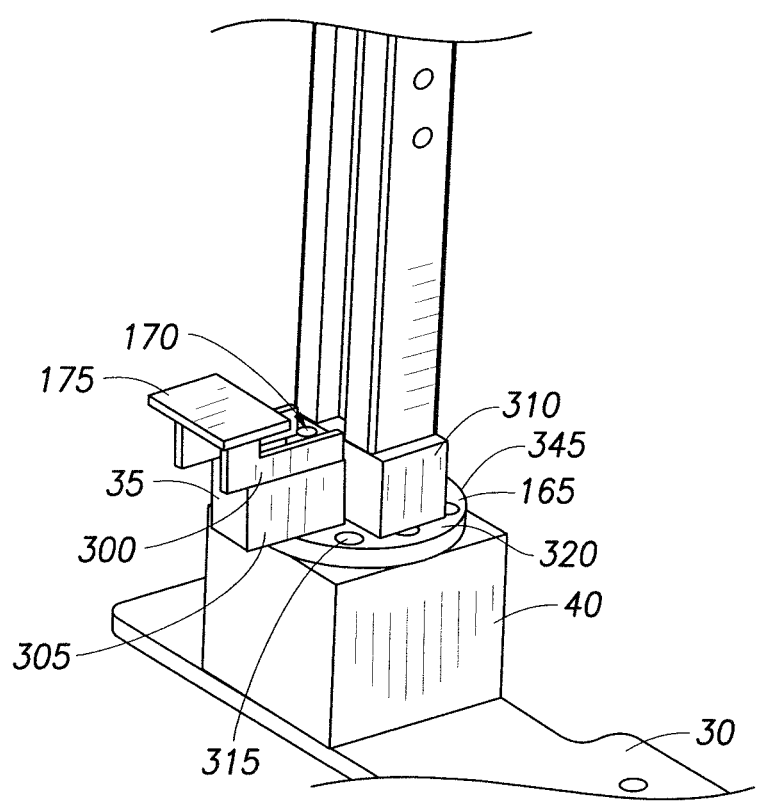
FIG. 7 illustrates a perspective view of an embodiment of a rail, foot pedal, energy attenuation box, and floor mounting.
Figure 8:
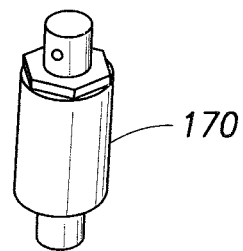
FIG. 8 illustrates a perspective view of an embodiment of a release pin.

FIG. 6 illustrates a cross sectional view of an embodiment of rail 20, foot pedal 35, and energy attenuation box 40. FIG. 7 illustrates a perspective view of an embodiment of rail 20, foot pedal 35, and energy attenuation box 40. Actuation of foot pedal 35 allows for lateral movement (i.e., rotation) of rail 20 and thereby the corresponding lateral movement (i.e., rotation) of collapsible platform 10. Foot pedal 35 has any configuration suitable for actuating rotation of collapsible platform 10. In embodiments, foot pedal 35 has release pin 170, foot contact portion 175, pedal arm 300, and pedal base 305. Release pin 170 extends through pedal arm 300. Actuation of foot pedal 35 actuates release pin 170 (i.e., lifts the release pin 170). FIG. 8 illustrates an embodiment of release pin 170. Foot contact portion 175 has a configuration suitable for receiving actuation pressure from a foot of an individual. In embodiments, foot contact portion 175 has a substantially flat horizontal surface. Foot contact portion 175 is attached to pedal 300, which is disposed upon pedal base 305. Pedal base 305 is disposed upon support plate 165 and attached to rail base 310. In embodiments as shown, rail 20 is attached to rail base 310. Rail base 310 is rotatable about bushing 160. In embodiments, bushing 160 is attached to support plate 165. Bushing 160 extends into an opening within rail base 310 to allow rail base 310 to rotate about bushing 160. In some embodiments, bushing 160 is self-lubricating. Support plate 165 is attached to energy attenuation box 40. In some embodiments (not illustrated), support plate 165 is attached to floor mounting 30 or the floor of the vehicle. In embodiments as shown, floor mounting 30 is secured to the floor of the vehicle. In embodiments as shown, support plate 165 has a plurality of support plate openings 315. Support plate openings 315 are openings into support plate 165 with sufficient depth and width to allow insertion of release pin 170. In embodiments as shown, support plate openings 315 are disposed circumferentially about top surface 320 of support plate 165. In embodiments, support plate openings 315 each are disposed at about the same distance inward from the edge 345 of support plate 165. Actuation of foot pedal 35 (i.e., by a foot of an individual applying pressure to foot contact portion 175) causes downward movement of the end of pedal arm 300 attached to foot contact portion 175 and upward movement of the end of pedal arm 300 through which release pin 170 extends, which lifts release pin 170 upward and out of the particular support plate opening 315 in which it is disposed. Rail 20 (and correspondingly foot pedal 35 and collapsible platform 10) may then be rotated to the desired position. The pressure applied to foot pedal 35 may then be removed, which allows upward movement of the end of pedal arm 300 attached to foot contact portion 175 and downward movement of the end of pedal arm 300 through which release pin 170 extends, which forces release pin 170 to move downward into a support plate opening 315 at the desired location thereby locking rail 20 (and correspondingly collapsible platform 10 and foot pedal 35) into place.

In embodiments as shown in FIGS. 1-4, 6, and 7, support plate 165 is attached to energy attenuation box 40 (e.g., to the top side of energy attenuation box 40). The opposing side of energy attenuation box 40 is attached to floor mounting 30. In alternative embodiments (not illustrated), energy attenuation box 40 is attached to the floor of the vehicle. Energy attenuation box 40 includes any system suitable for reducing or preventing energy applied to the bottom of wall rail platform system 5 (i.e., to the bottom of rail 20) passing to the individual standing on collapsible platform 10. For instance, a mine or improvised explosive device exploding underneath or near the military vehicle applies force to the military vehicle and thereby to rail 20 and collapsible platform 10. Energy attenuation box 40 reduces or prevents the energy from passing through to rail 20 and also to the individual standing on collapsible platform 10, thereby protecting the individual from harm. Without limitation, an example of a suitable energy attenuation system disposed in energy attenuation box 40 includes a SHOCKRIDE CRUSH BOX, commercially available from ArmorWorks Enterprises, LLC.

Figure 9:
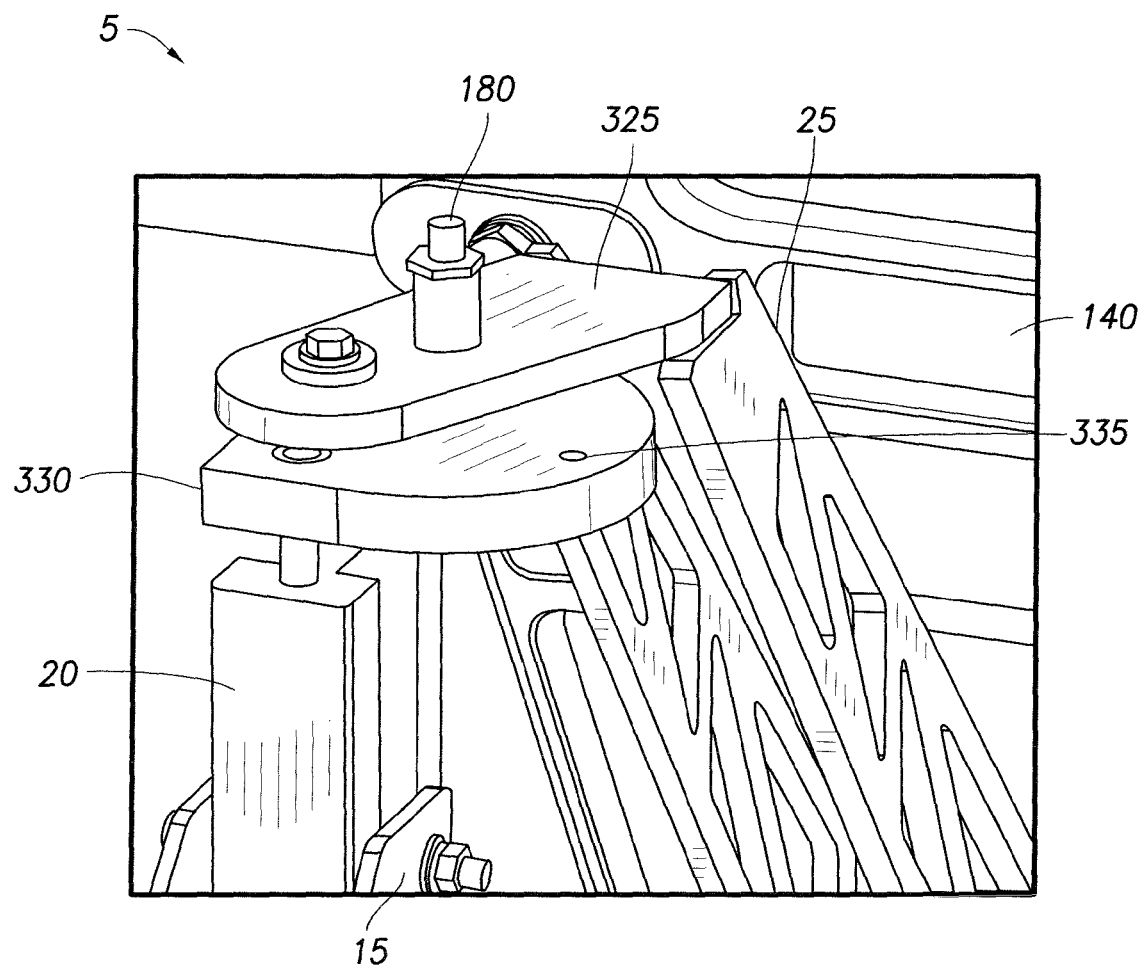
FIG. 9 illustrates a perspective view of an embodiment of a rail, wall mounting, and hand pin.

FIG. 9 illustrates an alternative embodiment of wall rail platform system 5 in which a hand pin 180 is to control rotation of rail 20 (and accordingly collapsible platform 10). In embodiments, hand pin 180 is used instead of foot pedal 35. In such embodiments as shown in FIG. 9, wall rail platform system 5 includes hand pin 180, wall mounting plate 325 and hand pin plate 330. In embodiments, wall mounting plate 325 is attached to wall mounting 25. Hand pin plate 330 is rotatably attached to wall mounting plate 325. Hand pin plate 330 is attached to rail 20. Hand pin plate 330 has a plurality of hand pin plate openings 335. Each hand pin plate opening 335 has sufficient depth and width to receive a portion of hand pin 180. Hand pin 180 is insertable through wall mounting plate 325 and into a hand pin plate opening 335. To rotate rail 20 and therefore collapsible platform 10, hand pin 180 is lifted to a position at which it is not disposed in a hand pin plate opening 335. Rail 20 is rotated to a desired position for collapsible platform 10, and hand pin 180 is inserted through wall mounting plate 325 and into the hand pin plate opening 335 at the desired position for the collapsible platform 10. In such embodiments, rail 20 is rotatable about bushings or any other suitable means. In embodiments as shown in FIGS. 1 and 9, wall mounting 25 is secured to wall 140 of the vehicle and also to rail 20 on the opposing end of rail 20 from energy attenuation box 40.

Figure 10:
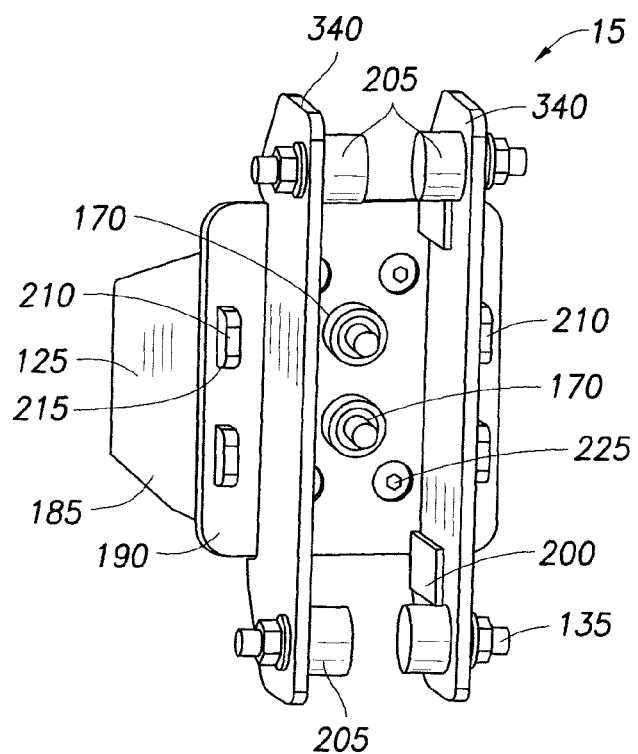
FIG. 10 illustrates a perspective back view of an embodiment of a carriage.
Figure 11:
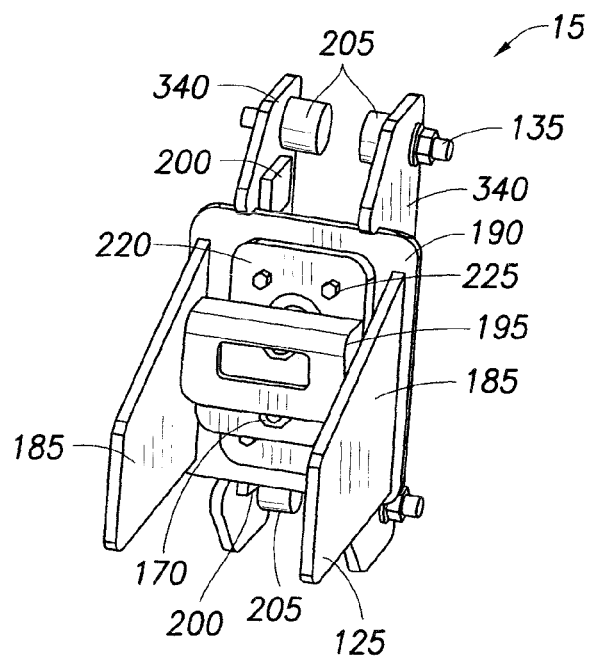
FIG. 11 illustrates a perspective front view of an embodiment of a carriage.

FIGS. 10 and 11 illustrate different views of an embodiment of carriage 15. Carriage 15 includes roller brackets 340. In embodiments, carriage 15 has two roller brackets 340 disposed about parallel to each other. Each roller bracket 340 has a roller 205 disposed on opposing longitudinal ends of the roller bracket 340 from each other. Each roller 205 is attached to a roller bracket 340 by roller attachment means 135. Roller attachment means 135 may be any suitable attachment means such as a bolt, washer, and nut. In embodiments as shown, each roller 205 is disposed about parallel to another roller 205 on the opposing roller bracket 340. Rollers 205 are any suitable rotatable device sufficient to allow carriage 15 to move vertically along rail 20. In embodiments, each roller 205 is disposed on an opposing roller guide 145 from another roller 205. The rollers 205 are rollable within roller guide 145 to allow vertical movement of carriage 15 along rail 20 (i.e., to allow carriage 15 to slide up and down along rail 20). Rail 20 is disposed between the two roller brackets 340. In some embodiments, carriage 15 has slider pads 200 disposed on the side of roller bracket 340 proximate rail 20. Carriage 15 also includes platform bracket 125 that includes platform bracket base 190. Roller brackets 340 are attached to platform bracket base 190. Platform bracket base 190 is attached to pull handle base 220 by pull handle base attachment means 225. Pull handle base attachment means 225 may be any suitable attachment means. In embodiments, pull handle base attachment means 225 comprises screws or bolts. Platform bracket 125 also includes platform bracket arms 185. Platform bracket base 190 is attached to platform bracket arms 185, which are attached to collapsible platform 10. Collapsible platform 10 is attached to platform bracket arms 185 by any suitable means. In embodiments, platform bracket arms 185 are about parallel to each other. Platform bracket arms 185 are attached to platform bracket base 190 by any suitable means. In embodiments, platform bracket arms 185 are attached to platform bracket base 190 by press fit. Embodiments include each platform bracket arm 185 having platform bracket arm extensions 210, which are insertable by press fit through platform bracket brace openings 215 of platform bracket base 190. Carriage 15 also includes pull handle 195. Pull handle 195 has release pins 170 that extend through pull handle 195. In alternative embodiments (not shown), carriage 15 may have one release pin 170 or more than two release pins 170. Release pins 170 are also extendable through platform bracket base 190 and pull handle base 220 as well as through mounts 150. Pull handle base 220 is attached to platform bracket base 190. Pressure applied by an individual to pull handle 195 away from platform bracket base 190 also pulls release pins 170 out of mounts 150, which allows vertical movement (i.e., slide) up or down of carriage 15 along rail 20 and correspondingly causes movement of collapsible platform 10. Collapsible platform 10 may be then be moved to the desired vertical position, and pull handle 195 may then be pressed back in the direction of platform bracket base 190, which then pushes release pins 170 into the mounts 150 at the desired vertical position.

Figure 12:
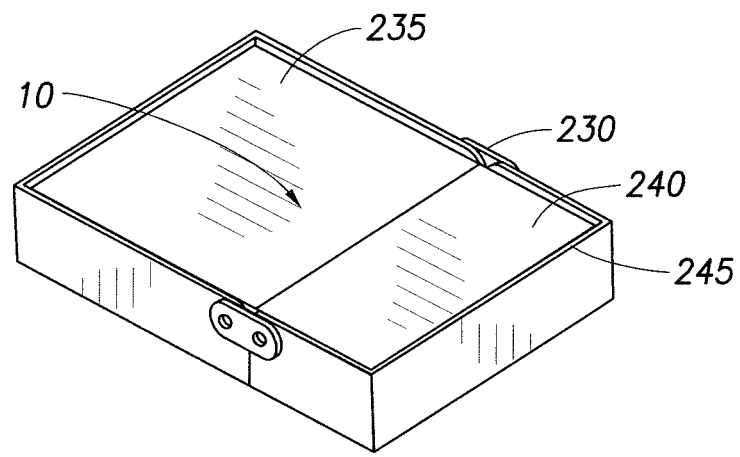
FIG. 12 illustrates a top perspective view of an embodiment of a collapsible platform when not collapsed.
Figure 13:
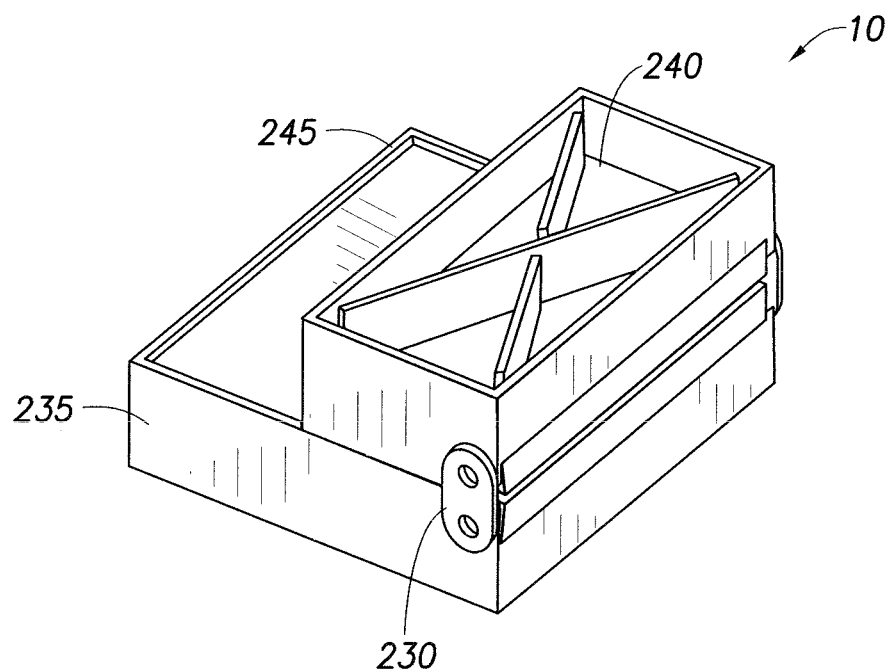
FIG. 13 illustrates a top perspective view of an embodiment of a collapsible platform in an un-collapsed position.

FIG. 12 illustrates an embodiment of collapsible platform 10 in an un-collapsed position. At such position, an individual may stand upon collapsible platform 10. For instance, in embodiments, an individual (i.e., soldier) disposed in soldier restraint system 50 is standing upon collapsible platform 10. In such embodiments, collapsible platform 10 provides physical support to the individual. Collapsible platform 10 comprises base portion 235 and collapsible base portion 240, which are attached to each other by collapsible platform brackets 230. A pin or pins (not illustrated) may be inserted through collapsible platform brackets 230 to secure collapsible platform 10 in the collapsed or un-collapsed position. In the un-collapsed position of FIG. 12, base portion 235 and collapsible base portion 240 provide about a parallel surface of collapsible platform 10 upon which an individual may stand. In the collapsed position of FIG. 13, collapsible base portion 240 is disposed upon base portion 235. In embodiments, collapsible platform 10 has base raised edge 245, which is a raised edge extending about the circumference of the top side of collapsible platform 10 when in the un-collapsed position.

It is to be understood that rail 20 is shown disposed between litter rack 45 and chair 110 for illustrative purposes only and may be disposed at other locations in the vehicle. In embodiments of the stowed position of collapsible platform 10, collapsible platform 10 extends into the interior of the vehicle laterally about the same distance or less than chair 110.

Figure 14:
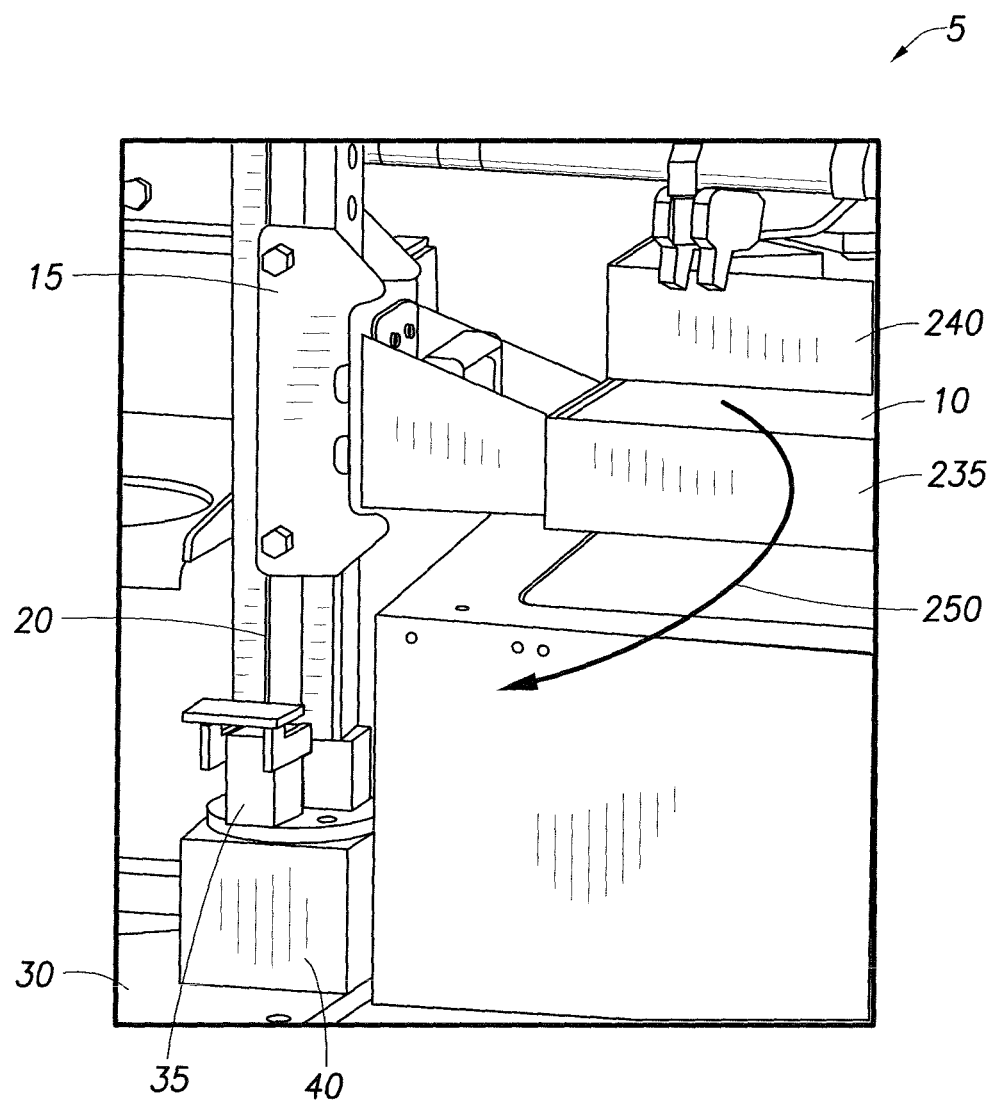
FIG. 14 illustrates a perspective view of an embodiment of a collapsible platform in a collapsed position when laterally rotated.
Figure 15:
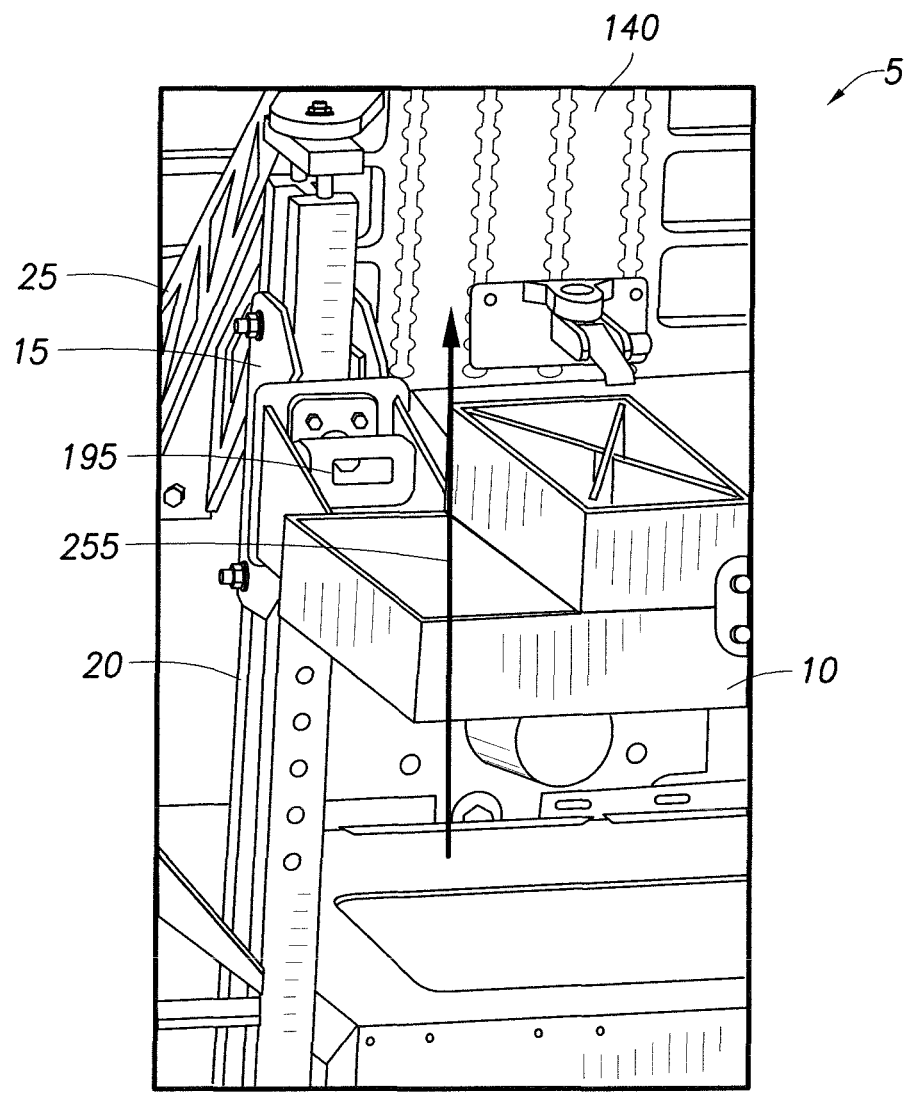
FIG. 15 illustrates a perspective view of an embodiment of a collapsible platform in a collapsed position when vertically rotated.
Figure 16:
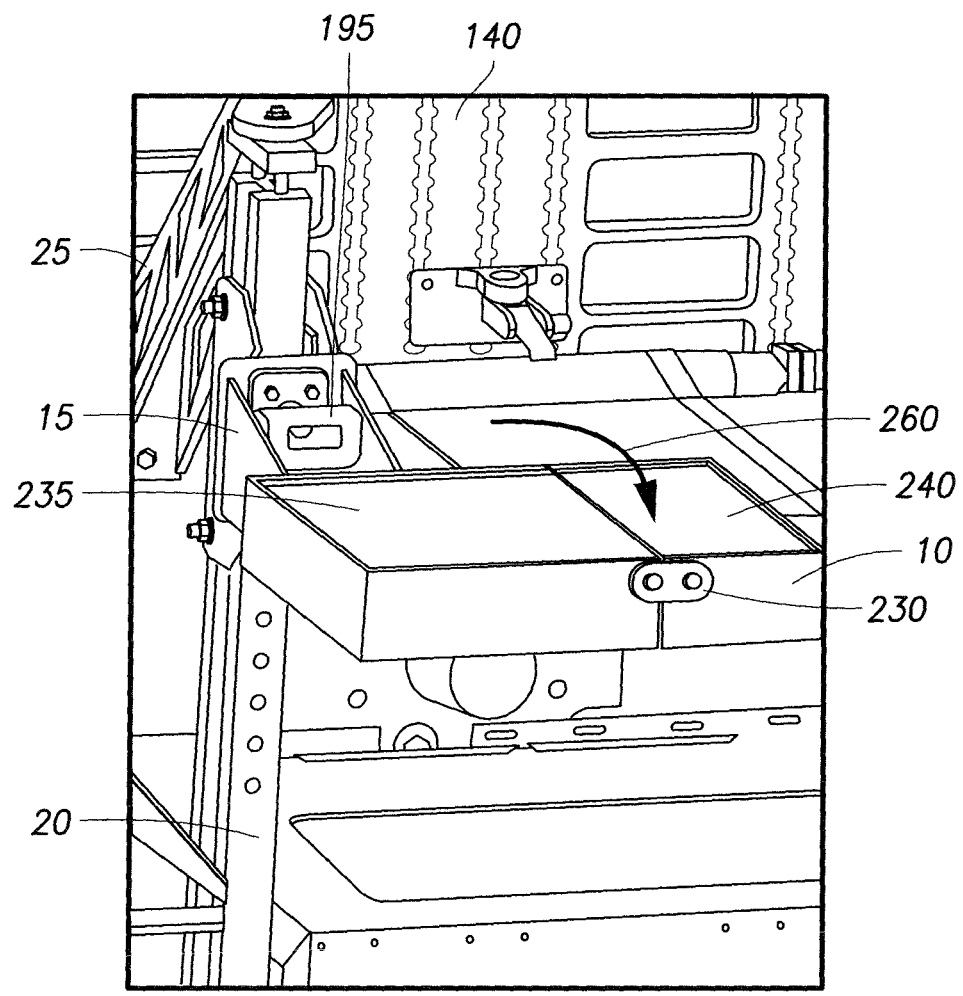
FIG. 16 illustrates a perspective view of an embodiment of a collapsible platform in an un-collapsed position.

FIGS. 14-16 illustrate movement of collapsible platform 10 in wall rail platform system 5. In FIG. 14, collapsible platform 10 is shown in a stowed position and in the collapsed position. To move collapsible platform 10, pressure is applied to foot pedal 35 (i.e., to depress foot contact portion 175) and allow rotation of rail 20 and collapsible platform 10. Arrow 250 is for illustration purposes only and shows the rotational movement of collapsible platform 10. In FIG. 15, the pressure has been removed from foot pedal 35 to secure collapsible platform 10 in the desired lateral position. Pull handle 195 has been pulled out allowing collapsible platform 10 to be moved to the desired vertical position. Arrow 255 is for illustration purposes only and shows the direction of vertical movement of collapsible platform 10. In FIG. 16, pull handle 195 is released to secure collapsible platform 10 in the desired vertical position. The pins are removed from collapsible platform brackets 230 to allow collapsible base portion 240 to be moved into the un-collapsed position. The pins may then be re-inserted through collapsible platform brackets 230 to secure collapsible platform 10 in the un-collapsed position. Arrow 260 is for illustration purposes only and shows the direction of movement of collapsible base portion 240 from the collapsed position to the un-collapsed position.

Figure 18:
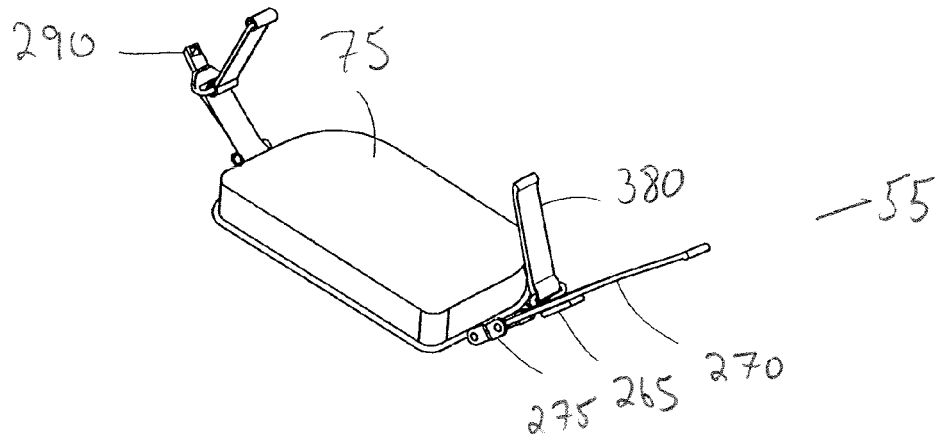
FIG. 18 illustrates a perspective view of a seat assembly.
Figure 19:
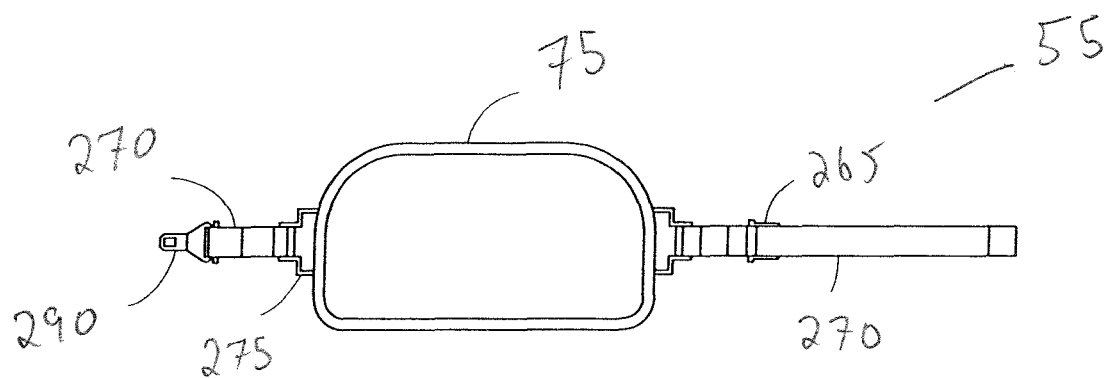
FIG. 19 illustrates a top view of a seat assembly.

FIG. 17 illustrates an embodiment of a soldier restraint system 50 that includes seat assembly 55 and restraint harness belt 60. Seat assembly 55 includes seat 75. Seat 75 may include any type of seat suitable for use in a vehicle. Seat 75 may also be composed of any material suitable for use in a vehicle. Without limitation, seat 75 may be composed of leather, plastic, nylon, and the like. In some embodiments, seat 75 includes a cushion. FIG. 18 illustrates a perspective view of an embodiment of seat 75. Seat 75 may have any configuration suitable for an individual (i.e., soldier) to sit upon. FIG. 19 illustrates a top view of an embodiment of seat 75. As illustrated, straps 270 are attached to seat 75. Straps 270 are attached to seat 75 by strap attachment means 275. Strap attachment means 275 include any means suitable for attaching straps 270 to seat 75. In embodiments as illustrated in FIGS. 17-19, strap attachment means 275 are brackets that allow straps 270 and seat 75 to swivel in relation to each other. Straps 270 may be composed of any material suitable for use in a vehicle such as nylon, leather, and the like. In some embodiments, straps 270 are suitably attached on opposing sides of seat 75 to provide balance to an individual sitting in seat 75. In embodiments as illustrated in FIGS. 17-19, two straps 270 are attached to seat 75. In alternative embodiments (not illustrated), more than two straps 270 are attached to seat 75. Mounting assemblies 65, 65' attach soldier restraint system 50 to the interior of the vehicle.

Figure 20:
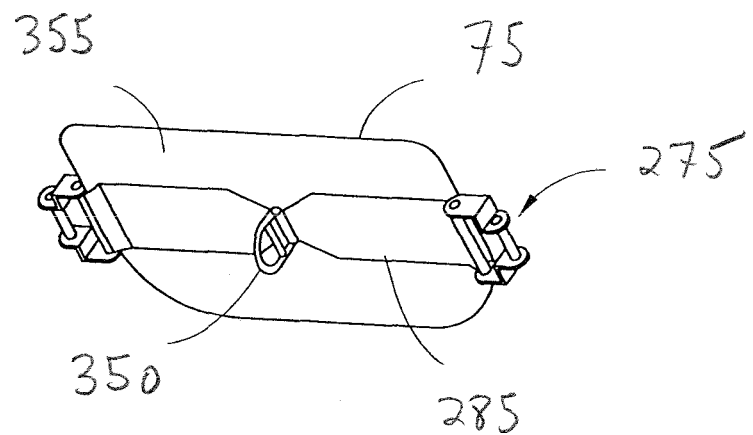
FIG. 20 illustrates a perspective bottom view of a seat assembly.

FIG. 20 illustrates a bottom perspective view of an embodiment of seat 75 in which seat 75 includes seat base strap 285. Seat base strap 285 includes base strap attachment means 350. Seat base strap 285 may be attached to bottom side 355 of seat 75 by any suitable means. In an embodiment as illustrated in FIG. 20, seat base strap 285 is attached to strap attachment means 275 and is disposed on bottom side 355. Base strap attachment means 350 includes any means suitable for securing seat 75 to another object such as the floor of the vehicle or a platform within the vehicle. In some embodiments, a strap (not illustrated) is secured to a platform in the vehicle and is attached to seat 75 at base strap attachment means 350. Sufficient tension is provided in the strap to prevent unwanted upward movement of seat 75 in the vehicle. For example, in an instance in which the vehicle rolls over, the tension in the strap attached to base strap attachment means 350 prevents seat 75 and an individual secured in seat 75 from harm by limiting the movement of seat 75. In an embodiment, seat base strap 285 has sufficient tension between the strap attachment means 275 to provide contact between seat base strap 285 and bottom side 355 and to not substantially lose the contact when secured to the strap.

In an embodiment as illustrated in FIG. 17, mounting assemblies 65, 65' are secured inside the vehicle. In some embodiments, mounting assemblies 65, 65' are secured to inside surfaces such as walls of the vehicle (i.e., vehicle wall 140) or a gun turret of the vehicle. FIG. 17 illustrates an embodiment of soldier restraint system 5 having mounting assemblies 65, 65' on opposing sides of seat 75. In embodiments as illustrated in FIG. 17, one mounting assembly 65 has an attached release assembly 70. The attached release assembly 70 is attached to a strap 270 that attaches mounting assembly 65 to seat 75. Strap 270 may be secured to seat 75 by any suitable means. In an embodiment as illustrated, strap 270 is secured to seat 75 by strap attachment means 275. Strap attachment means 275 includes any means suitable for attaching a strap to a seat. In an embodiment as shown, strap attachment means 275 is a bracket that swivels. Without limitation, a bracket that swivels allows limited motion of seat 75. In some embodiments, strap 270 includes adjusting means 265. Adjusting means 265 is any means suitable for adjusting the length of strap 270 between release assembly 70 and seat 75. The other mounting assembly 65' has an attached mounting strap 280 with a release assembly 70 attached on the opposing end of mounting strap 280 from mounting assembly 65'. In some embodiments, mounting strap 280 includes adjusting means 265. Seat 75 is attached to mounting assembly 65' by a strap 270 that attaches the release assembly 70 to seat 75. FIG. 17 illustrates an embodiment of soldier restraint system 5 that has two mounting assemblies 65, 65' but it is to be understood that soldier restraint system 5 is not limited to two mounting assemblies 65, 65' but in alternative embodiments (not illustrated) may have more than two mounting assemblies. Mounting assemblies 65, 65' are secured in the vehicle at a sufficient height to suspend seat 75 at a desirable height in the vehicle (i.e., from the floor or a platform in the vehicle). Adjusting means 265 allow the length of straps 270, 280 to be adjusted to adjust the suspension height of seat 75. Straps 270 attach seat 75 to release assemblies 70 by attachment means 290. Attachment means 290 may include any suitable means for attaching a strap to an object such as a hook, bracket, latch, and the like. Strap 270 and mounting strap 280 have a sufficient tension to facilitate suspension of seat 75 but in some embodiments also have a sufficient tension to allow the individual to have a desirable amount of movement while secured in seat 75. For instance, in an embodiment in which soldier restraint system 50 is secured in the vehicle to allow the individual to sit in a gun turret of the vehicle, the soldier may have a desire to move about in the interior when operating a weapon in a combat situation or to view outside the vehicle. Mounting assemblies 65, 65' may be secured in the vehicle at any degrees apart to provide a seat 75 of sufficient stability to allow an individual to sit in seat 75.

FIG. 17 illustrates an embodiment of soldier restraint system 50 in which one mounting assembly 65 has a release assembly 70 attached to the mounting assembly 65, and the other mounting assembly 65' has a release assembly 70 attached with a mounting strap 280 attached in between the mounting assembly 65' and the release assembly 70. Without limitation, the mounting assembly 65 has the release assembly 70 attached to provide a release assembly 70 at a sufficient proximity to the individual sitting in seat 75 to allow the individual to pull the release assembly 70 and quickly drop seat 75. Further, without limitation, the mounting assembly 65' has the release assembly at a lower position in relation to seat 75 to provide a release assembly 70 at a sufficient proximity to other individuals in the vehicle to pull the release assembly 70 and quickly drop seat 75. For instance, soldier restraint system 50 may be mounted in a gun turret of the vehicle wherein the soldier secured in soldier restraint system 50 has the upper portion of the soldier's body exposed outside of the vehicle. In a combat situation, the soldier secured in soldier restraint system 50 may desire to quickly drop down in the vehicle for protection by the vehicle. In such a situation, the release assembly 70 attached to mounting assembly 65 provides a convenient release assembly 70 by which the soldier may pull and release seat 75, thereby allowing the soldier to drop into the vehicle for protection. The soldier may also pull the release assembly 70 attached to the mounting assembly 65' with the mounting strap 280 in between, but, with seat 75 in an elevated position allowing the soldier to be positioned in the gun turret, the position of such release assembly 70 provides a convenient release for other soldiers in the vehicle to pull and release seat 75 to allow the soldier to drop into the vehicle for protection. For instance, the soldier may be injured and unable to pull a release strap 115, and such lower positioned release strap 115 allows the other soldiers to pull the release strap 115 and thereby allow the injured soldier to be quickly protected inside the vehicle. It is to be understood that soldier restraint system 50 is not limited to release assembly 70 attached to one mounting assembly 65 and another release assembly 70 disposed at a lower position in relation to seat 75. Soldier restraint system 50 may have release assemblies 70 disposed at any position in relation to seat 75. In an alternative embodiment (not illustrated), a mounting assembly 65 and/or 65' may have one release assembly 70 attached to the respective mounting assembly and at least one other release assembly 70 disposed between the one release assembly 70 and seat 75. In other alternative embodiments (not illustrated), both mounting assemblies 65, 65' have a release assembly 70 attached to the respective mounting assembly 65, 65'. In some alternative embodiments (not illustrated), both mounting assemblies 65, 65' have an attached release assembly 70 with a mounting strap 280 disposed between the respective mounting assembly and the release assembly 70. It is to be understood that when one release assembly 70 is pulled to release seat 75 from the respective mounting assembly 65 or 65', seat 75 remains secured to the other mounting assembly 65 or 65', which protects the individual secured in soldier restraint system 5 in the event of a roll over or injury from other motion of the vehicle.

Figure 21:
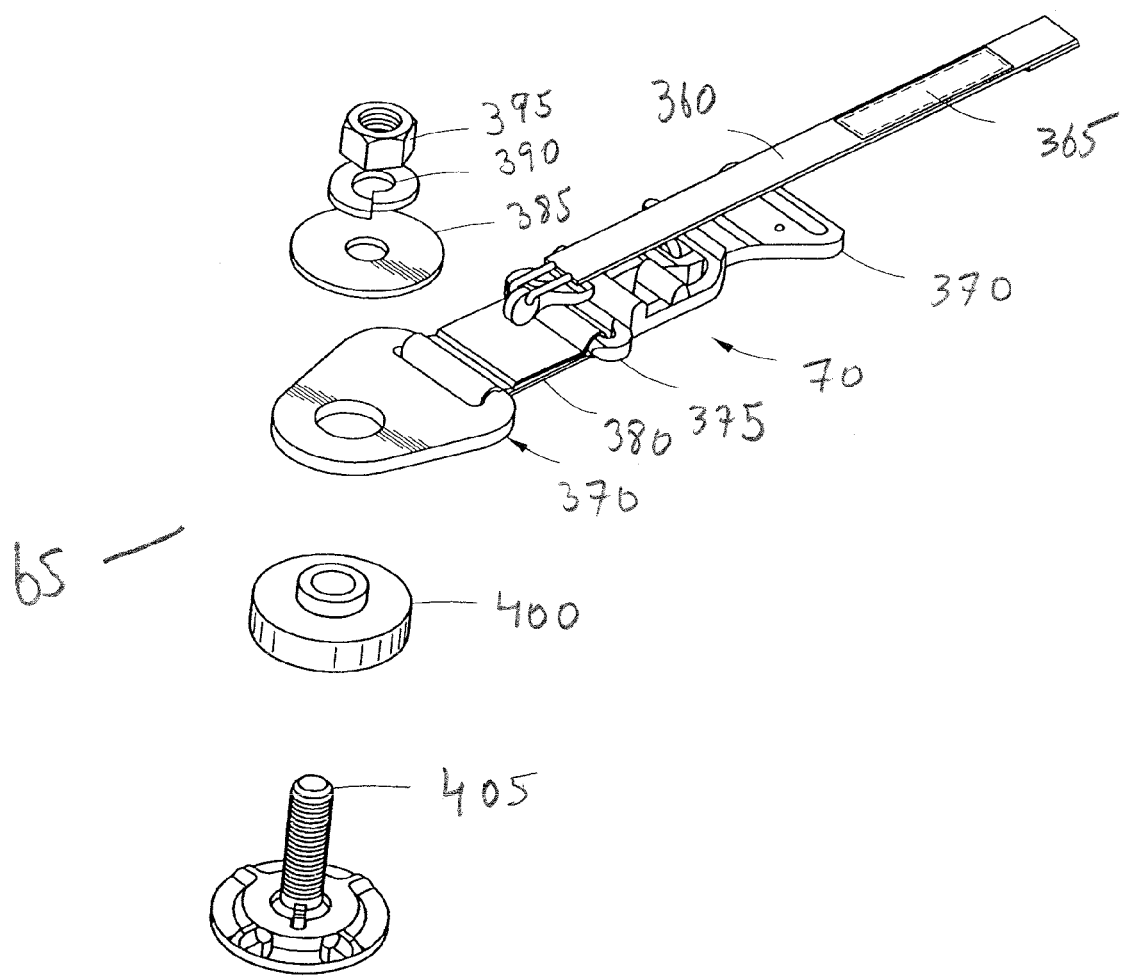
FIG. 21 illustrates a mounting assembly and a release assembly.

FIG. 21 illustrates an embodiment of a mounting assembly 65 with release assembly 70 attached. For illustration purposes only, mounting assembly 65 is shown in an exploded view. Mounting assembly 65 may include any suitable method for securing a strap to a wall. For instance, mounting assembly 65 may include nails, hooks, screws, adhesives, studs, magnets, and the like. In an embodiment as illustrated, mounting assembly 65 includes a bond stud 405, which secures bracket 370 of release assembly 70 within the vehicle. In an embodiment in which bond stud 405 secures bracket 370 to a steel surface inside the vehicle, the surface of the steel may be prepared and then bond stud 405 may be allowed to cure on the steel. In some embodiments, a bushing 400 slides over bond stud 405. Other embodiments also include mounting assembly 65 including other securing means such as washer 385, lock washer 390, and nut 395. Without limitation, with mounting assembly 65 including bond stud 405, the vehicle surface does not need to be welded or drilled to secure seat 75, which provides a reinforced substrate strength and facilitates corrosion resistance. Further, without limitation, welding or drilling on armor plate steel may compromise the integrity of the armor system.

As shown in FIG. 21, release assembly 70 includes latch and base release 375 and release strap 360. In the embodiment as shown, mounting assembly 65 secures release assembly 70 by securing bracket 370 to the vehicle, with the bracket 370 attached to latch and base release 375 by tether 380. Release assembly 70 has another bracket 370 on the opposing end of release assembly 70 to secure release assembly 70 to strap 270 (not illustrated). A sufficient pulling force applied to release strap 360 releases latch and base release 375, releasing strap 270 from mounting assembly 65. Without limitation, release assembly 70 provides a quick release mechanism. Strap 270 may be re-attached to mounting assembly 65 by re-connecting latch and base release 375 together. In an embodiment, release strap 360 has a reflector 365. Reflector 365 includes any reflective material that is suitable for attachment to a strap 270 and for use in a military vehicle. Without limitation, reflector 365 improves the visibility of release strap 360. It is to be understood that release assembly 70 is not limited to the embodiment illustrated in FIG. 21 but may include any other mechanisms suitable for allowing such a quick release. In an embodiment, release assembly 70 is a quick release mechanism of the type referred to as an ejector hook for use in the parachute industry.

Figure 22:
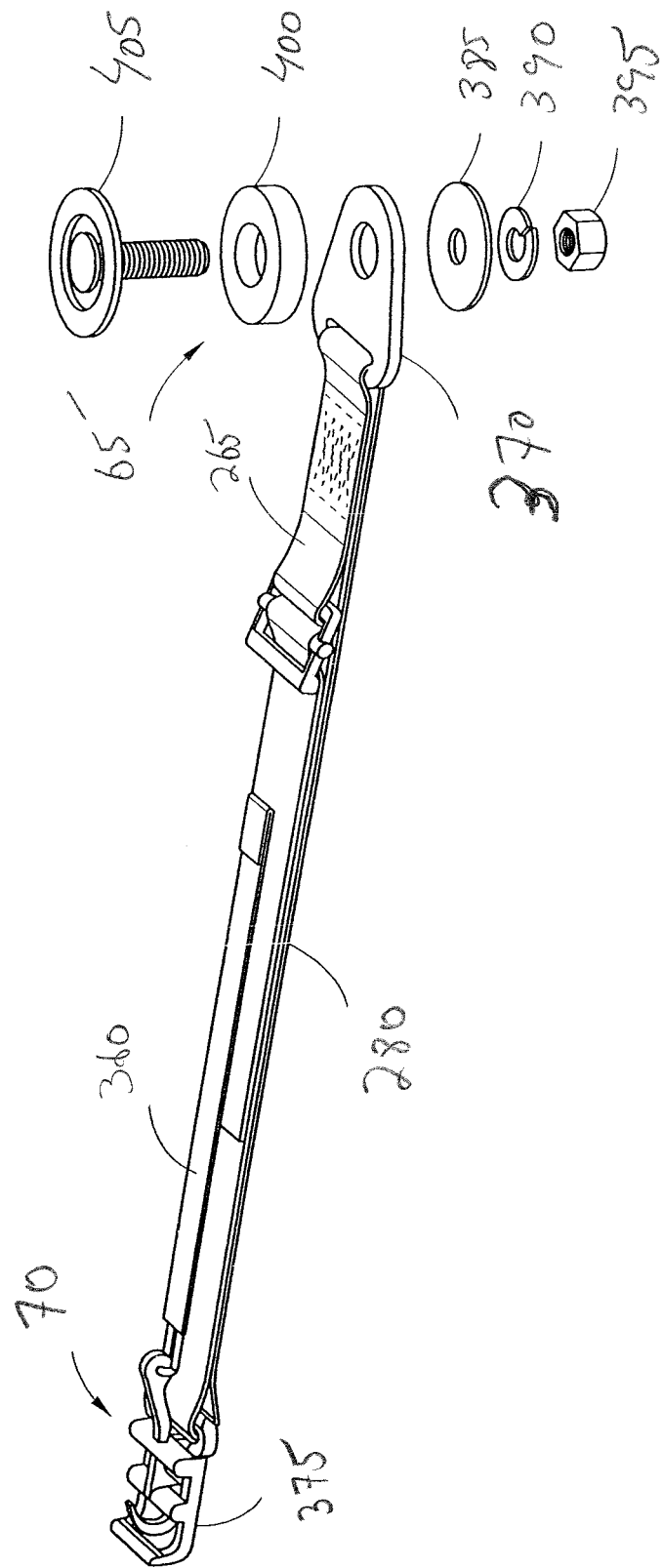
FIG. 22 illustrates a mounting assembly, mounting strap, and a release assembly.

FIG. 22 illustrates an embodiment in which mounting assembly 65' is attached to mounting strap 280 with release assembly 70 attached to mounting strap 280 on the opposing end from mounting assembly 65'. For illustration purposes only, mounting assembly 65' is shown in an exploded view. In an embodiment as shown, mounting strap 280 has a length that is adjustable by adjusting means 265. Bond stud 405 passes through bracket 370 to secure mounting strap 280, with the opposing end of mounting strap 280 secured to release assembly 70. As shown in FIG. 17, strap 270 is secured to the opposing end of release assembly 70 from mounting strap 280.

Figure 23:
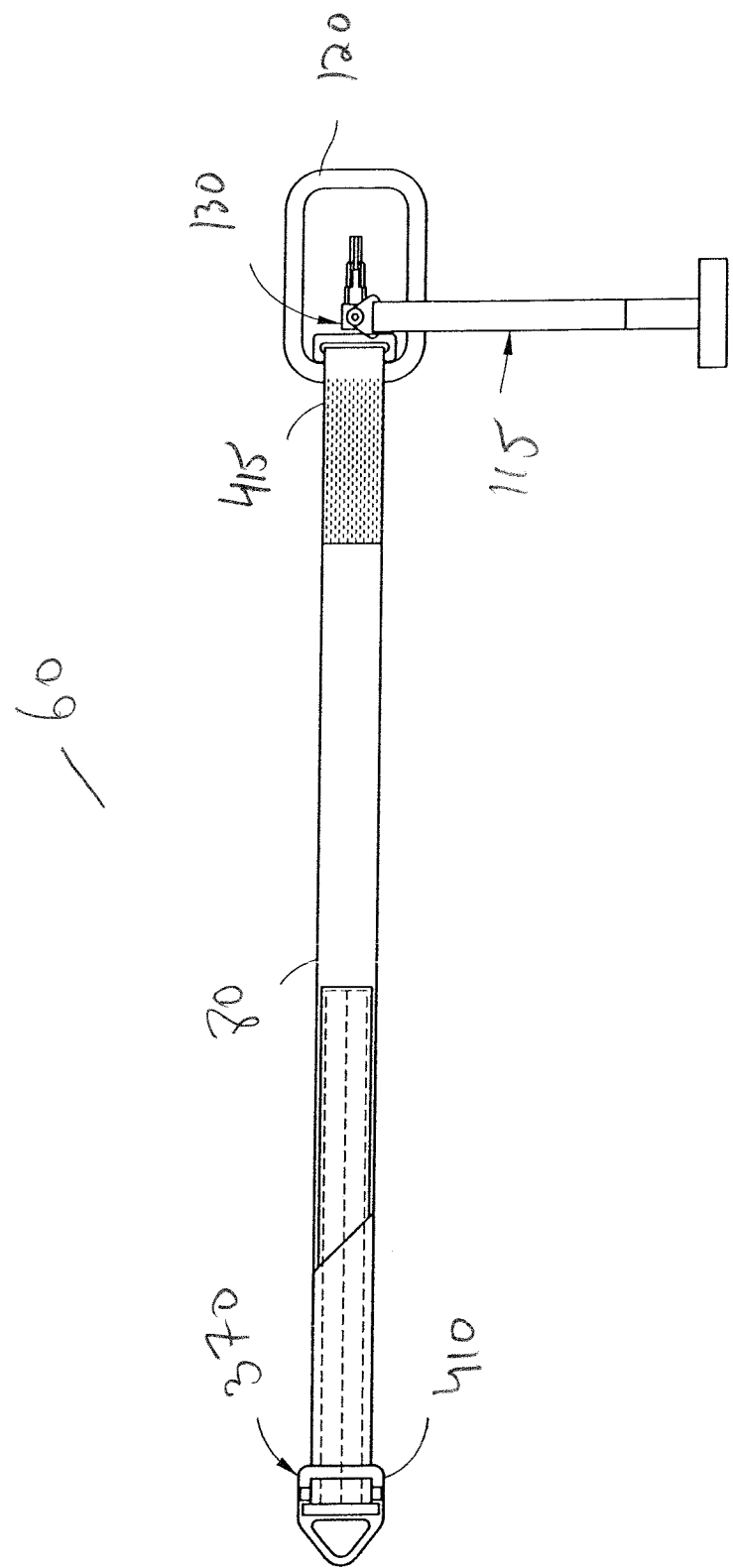
FIG. 23 illustrates a front view of a restraint harness belt.

FIG. 23 illustrates an embodiment of restraint harness belt 60 in which restraint harness belt 60 has belt strap 80 and bracket 370. Belt strap 80 has bracket 370 secured to one end and belt release 130 secured to the opposing end of belt strap 80. Belt release 130 is any mechanism suitable for receiving bracket 370 and securing ends 410 and 415 together. It is to be understood that restraint harness belt 80 is not limited to bracket 370 and belt release 130 but may include any other suitable means for attaching ends 410 and 415 together. In an embodiment as shown, belt strap 80 has an adjustable length, which allows belt strap 80 to be adjusted to the waist of the individual to suitably secure the individual in soldier restraint system 50. In an embodiment as illustrated in FIG. 23, pull strap 115 is attached to the release mechanism of belt release 130. A suitable pulling force applied to pull strap 115 activates the release mechanism and releases bracket 370 from belt release 130. Without limitation, pull strap 115 provides a quick release of restraint harness belt 60 and allows the individual to exit restraint harness belt 60 quickly. In an embodiment as illustrated in FIG. 23, restraint harness belt 60 has belt pad 120. Belt pad 120 may have any configuration and size suitable for providing a cushion between the individual and bracket 370 and belt release 130 when secured to each other.

FIGS. 17 and 18 illustrate an embodiment of soldier restraint system 50 in which restraint harness belt 60 is attached to seat assembly 55 by tethers 380. The tethers 380 may be secured to any suitable part of seat assembly 55. In an embodiment, tethers 380 are secured to straps 270 and/or seat 75. Tethers 380 are also secured to belt strap 80. Tethers 380 may be secured to belt strap 60 at any suitable location. In an embodiment, tethers 380 are slidably attached to belt strap 80, which allows the location of tethers 380 to be adjusted. Without limitation, adjusting the location of tethers 380 on belt strap 80 allows their location to be adjusted to take into account an adjustment in the length of belt strap 80. Tethers 380 may be secured to seat assembly 55 by any suitable means. In an embodiment, tethers 380, straps 270, and mounting strap 280 have sufficient tension to maintain the desired suspension of seat 75 to secure the individual within soldier restraint system 50 but also to allow the individual a desired amount of ability to conduct desired tasks (i.e., operate a weapon in the gun turret, lean over, turn body to view outside vehicle, and the like).

Figure 24:
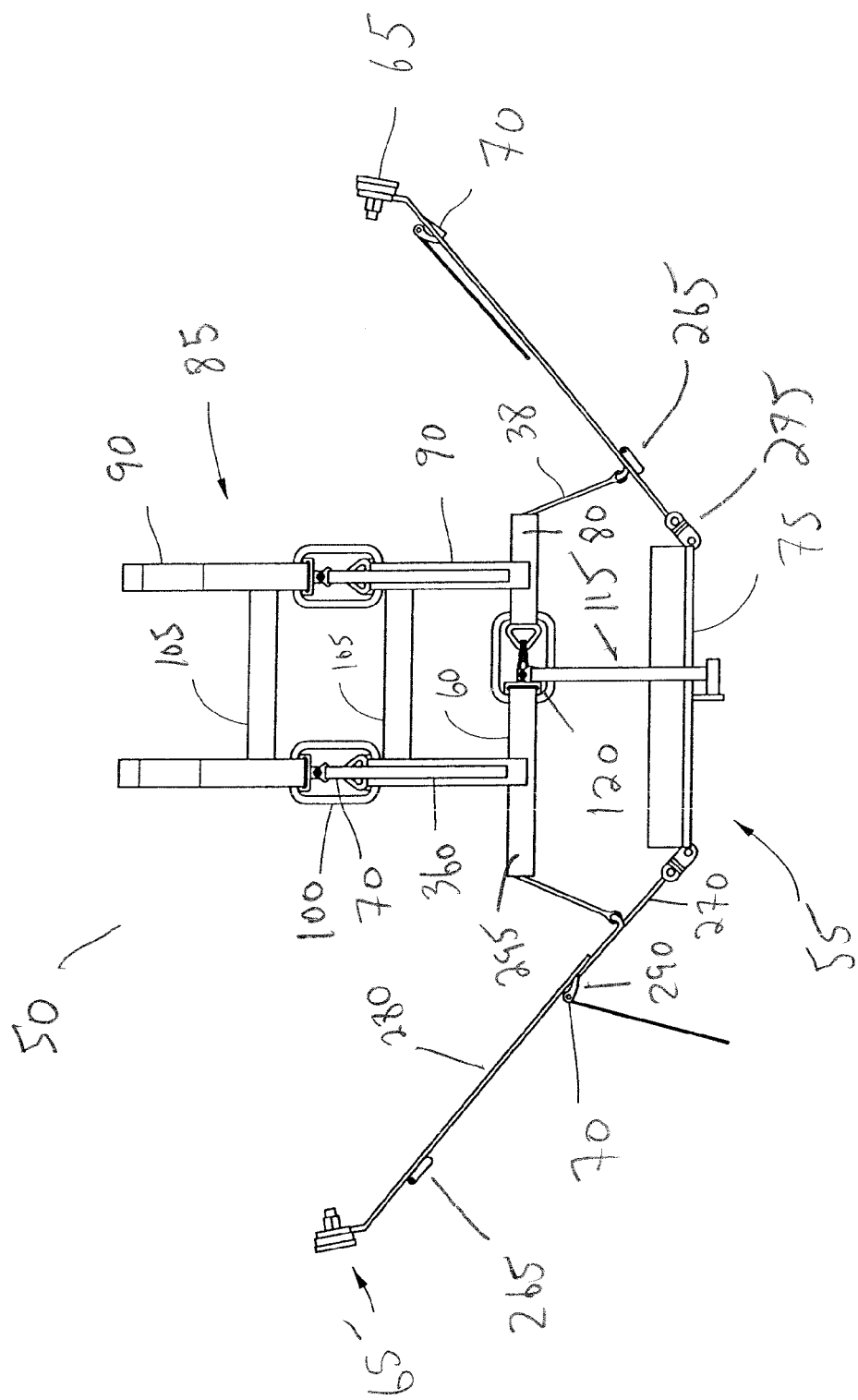
FIG. 24 illustrates a front view of a soldier restraint system having a seat assembly, a restraint harness belt, and a shoulder harness.
Figure 25:
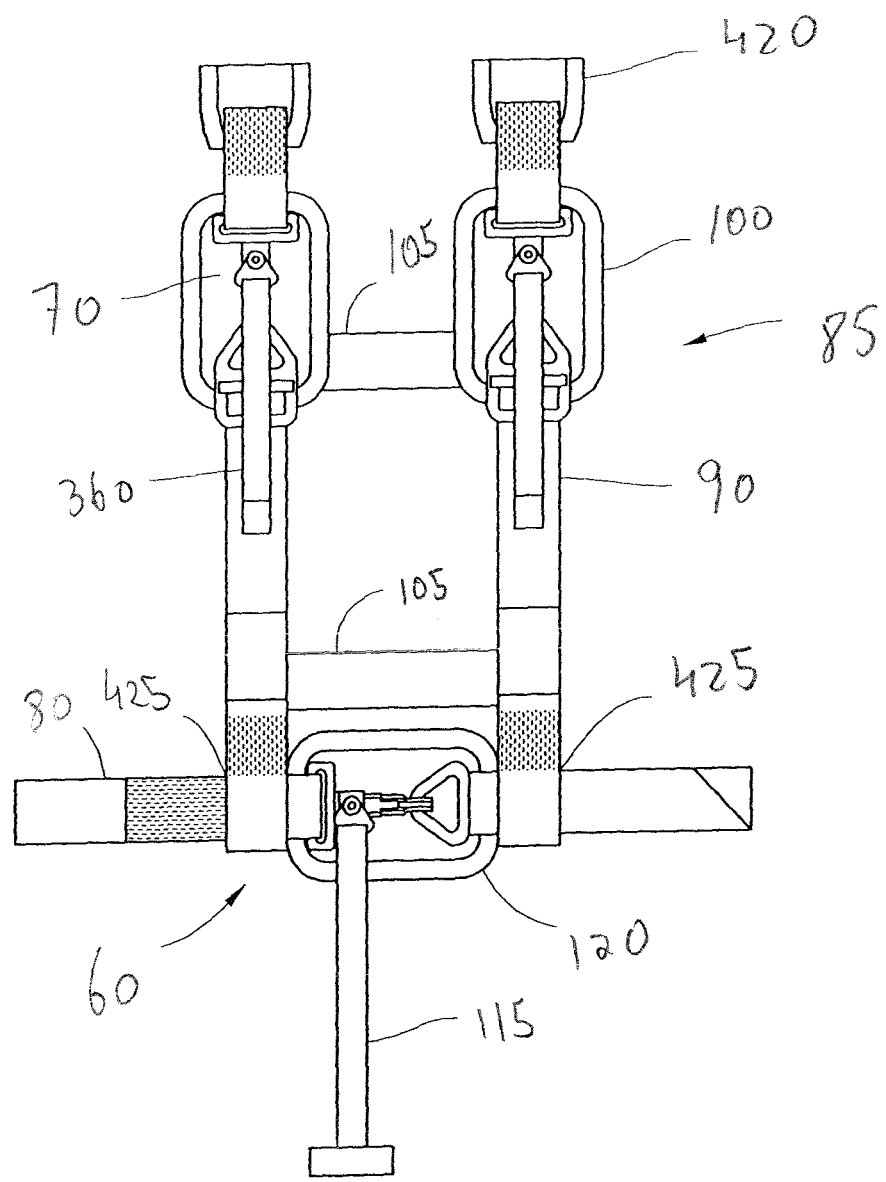
FIG. 25 illustrates a front view of a restraint harness belt and a shoulder harness.

FIG. 24 illustrates an embodiment of soldier restraint system 50 in which shoulder harness 85 is attached to restraint harness belt 60. FIG. 25 illustrates a front view of shoulder harness 85 attached to restraint harness belt 60. Shoulder harness 85 includes shoulder harness straps 90. FIG. 26 illustrates a side view of an embodiment of soldier restraint system 50 having shoulder harness 85. In an embodiment as illustrated, shoulder harness 85 has two shoulder harness straps 90 that are each attached to the front side 435 and back side 430 of restraint harness belt 60. Each shoulder harness strap 90 passes over the shoulder of the individual. Shoulder harness straps 90 have a tension sufficient to secure the individual within soldier restraint system 50 but that also allows the individual to conduct desired tasks. In some embodiments, the width between shoulder harness straps 90 is adjustable. Without limitation, adjusting the width between shoulder harness straps 90 allows the shoulder width of different individuals to be taken into account. The width may be adjusted by any suitable means. In embodiments as illustrated, belt strap 80 passes through loops 425 in each shoulder harness strap 90 to allow adjustment of the width. It is to be understood that shoulder harness 85 is not limited to two shoulder harness traps 90 but in alternative embodiments (not illustrated) may also include more than two shoulder harness straps 90. In embodiments as illustrated, shoulder harness straps 90 each have a release assembly 70. In an embodiment, the release assemblies 70 have release straps 360. In some embodiments, the release assemblies 70 are located in the front of shoulder harness straps 90. Without limitation, locating the release assemblies 70 in the front of shoulder harness straps 90 allows the individual to release the shoulder harness 85, with the release straps 360 allowing a quick release. In alternative embodiments (not illustrated), only one of the shoulder harness straps 90 has a release assembly 70. In some embodiments as illustrated, shoulder harness straps 90 have buckle pads 100, which are disposed between the individual and release assembly 70. Buckle pads 100 may have any configuration and size suitable for providing a cushion between the individual and release assembly 70 when secured to each other. In some embodiments, shoulder harness 85 also includes back supports 105. FIG. 27 illustrates a back view of shoulder harness 85 and restraint harness belt 60 showing back supports 105. Shoulder harness 85 may have any desirable number of back supports 105. In embodiments as illustrated, shoulder harness 85 has a back support 105 in an upper region of shoulder harness 85 and a back support 105 in a lower region of shoulder harness 85. Without limitation, such locations of back supports 105 provide support for the upper and lower back of the individual. Back supports 105 may be composed of any suitable material. In some embodiments as illustrated, shoulder harness straps 90 also have shoulder pads 420. Without limitation, shoulder pads 420 provide a cushion to the shoulders of the individual.

Figure 28:
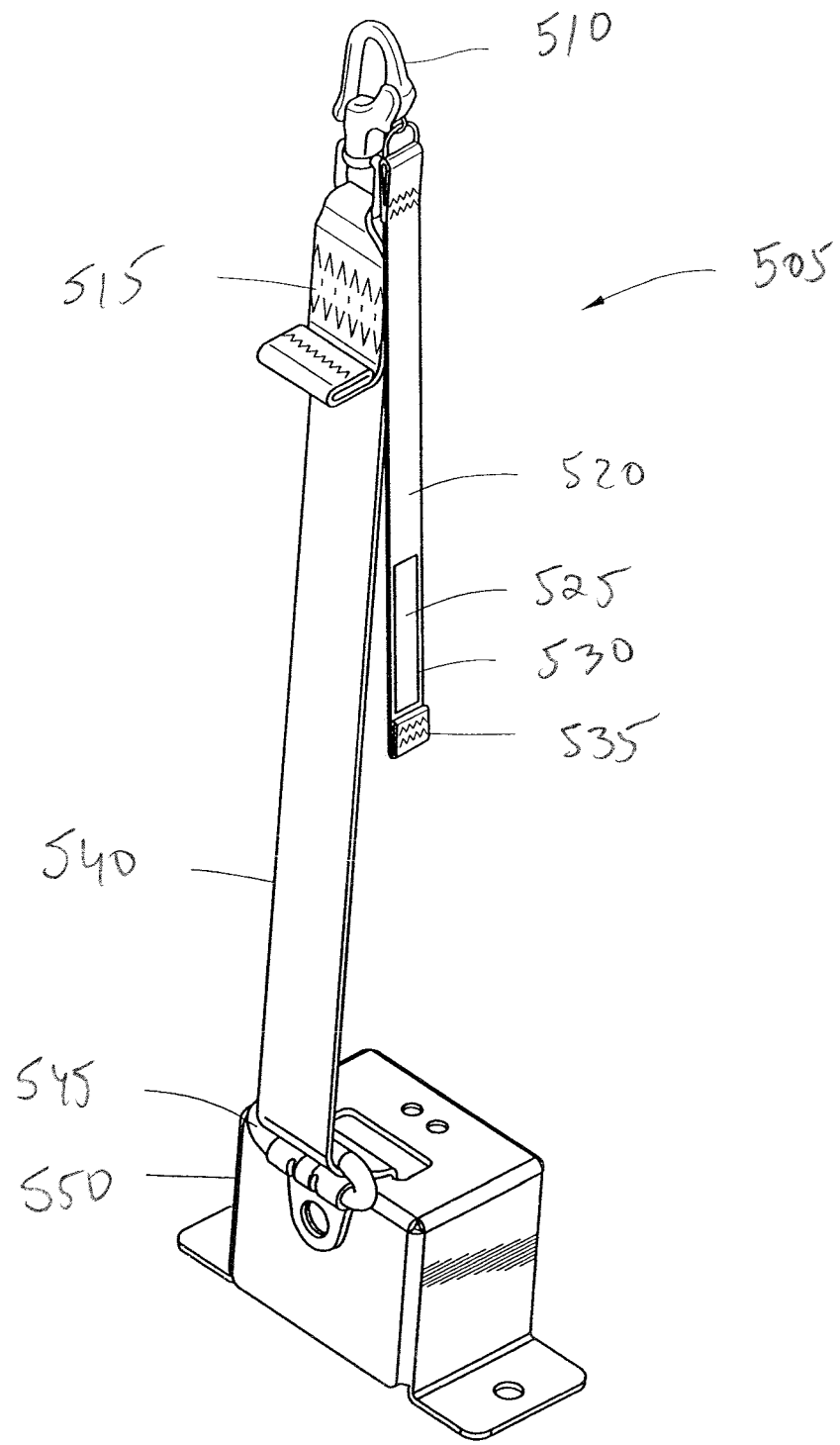
FIG. 28 illustrates an embodiment of a collapsible platform attachment means.

In an embodiment, soldier restraint system 50 further includes collapsible platform attachment means 505. FIG. 28 illustrates an embodiment of collapsible platform attachment means 505. Collapsible platform attachment means 505 includes any means suitable for attachment to seat assembly 55, restraint harness belt 60, or shoulder harness 85. In alternative embodiments, collapsible platform attachment means 505 may be attached to an individual (i.e., soldier) disposed in soldier restraint system 50. In an embodiment as illustrated in FIG. 28, collapsible platform attachment means 505 includes retractor strap 540, strap retractor 550 and release hook 510. Strap retractor 550 is a device suitable for retracting retractor strap 540 and for allowing extraction of retractor strap 540 from strap retractor 550. In embodiments, strap retractor 550 retracts retractor strap 540 upon strap thresholds being identified as achieved. Strap thresholds include any suitable criteria for retraction of retractor strap 540. In an embodiment, the strap thresholds include angle, acceleration, or any combination thereof. In embodiments, the strap thresholds are adjustable. For instance, without limitation, the strap thresholds may be adjusted according to the terrain or use of soldier restraint system 50. The angle may be any desirable angle. It is to be understood that angle refers to a degree of tilt of the vehicle in which soldier restraint system 50 is secured. In embodiments, the angle is above about 33 degrees, alternatively above about 40 degrees, and alternatively above about 43 degrees. In some embodiments, soldier restraint system 50 includes an angle sensor mechanism. The angle sensor mechanism may be disposed at any suitable location on the vehicle or on soldier restraint system 50. In embodiments, strap retractor 550 includes the angle sensor mechanism. The angle sensor mechanism may include any type of sensor that determines the angle of tilt of the vehicle. The acceleration may include any desirable acceleration of the extraction of retractor strap 540 from strap retractor 550. In embodiments, strap retractor 550 includes a sensor that determines the acceleration of the extraction of retractor strap 550. As an example, without limitation, the strap threshold for strap retractor 550 is set to above about 43 degrees. Upon the angle sensor mechanism sensing the vehicle exceeding an angle of about 43 degrees, strap retractor 550 retracts retractor strap 540 and thereby retracts the individual (i.e., soldier). Without limitation, an example of strap retractor 550 is a seat belt retractor (i.e., a seat belt retractor used in automobiles but with sufficient strength to retract the individual). Retractor strap 540 includes any suitable type of strap. For instance, in an embodiment, retractor strap 540 includes a long, narrow strip of pliant material such as webbing. In alternative embodiments (not illustrated), retractor strap 540 is a cable. In an embodiment, retractor strap 540 passes through strap ring 545 before entering and after exiting strap retractor 550. Without limitation, strap ring 545 facilitates extraction and retraction of retractor strap 540. A release hook 510 is attached to the end of retractor strap 540 opposite strap retractor 550. Release hook 510 includes any type of hook suitable for attaching to the individual or to soldier restraint system 50. In an embodiment as illustrated, release hook 510 is a quick release hook with a swivel. In some embodiments, collapsible platform attachment means 505 includes release strap 520. Release strap 520 is attached to release hook 510, and a sufficient pulling force on release strap 520 releases release hook 510. In an embodiment, release strap 520 includes a visual 525. Visual 525 includes any means for increasing visibility of release strap 520. In an embodiment, visual 525 includes fluorescent material. Visual 525 is secured to release strap 520 by any suitable means such as by stitching 530. In an embodiment, release strap 520 also includes grip 535 at the end of release strap 520 opposite the end of release strap 520 attached to release hook 510. In an embodiment, collapsible platform attachment means 505 includes strap adjustment 515. Strap adjustment 515 includes any means suitable for attaching release hook 510 to retractor strap 540 such as VELCRO, which is a registered trademark of Velcro Industries N.V.

In an embodiment (not illustrated), soldier restraint system 50 includes a release system. The release system includes a release sensor and releasable attachments. The release sensor may be disposed at any suitable location within or on the vehicle. In an embodiment, the release sensor is disposed inside the vehicle. In embodiments, the release sensor is disposed in the floor of the vehicle. In an embodiment, the release sensor includes a transmitter. The transmitter sends a signal to the releasable attachments when the release sensor senses a desired tilt of the vehicle. In an embodiment, the signal is for the releasable attachments to release from their attachment to the vehicle. The release sensor may be any suitable type of sensor for sensing tilt. In an embodiment, the release sensor is an angle sensor mechanism. In an embodiment, the tilt is the degree of tilt of the vehicle. The tilt may be any suitable degrees. In embodiments, the tilt is an angle (i.e., tilt of the vehicle) above about 33 degrees, alternatively above about 40 degrees, and alternatively above about 43 degrees. The releasable attachments are attachable to the vehicle. The releasable attachments are attachable to the vehicle by any suitable means. In an embodiment, the releasable attachments are attachable to the vehicle by magnetic induction. The releasable attachments are attachable to the inside or outside of the vehicle. In embodiments, the releasable attachments are attachable to the inside of the vehicle. Each releasable attachment has a releasable attachment strap that is secured to the releasable attachment and that is attachable to seat assembly 55, restraint harness belt 60, or shoulder harness 85. In alternative embodiments, the releasable attachment strap is attachable to an individual (i.e., soldier) disposed in soldier restraint system 50. The releasable attachment strap is a long, narrow strip of pliant material such as webbing. In alternative embodiments, the releasable attachment strap is a cable. In an embodiment of operation of the release system, the release sensor senses a tilt of the vehicle. If the tilt is at or above a desired tilt, the release sensor transmitter sends a signal to the releasable attachments to release from the attachment to the vehicle. In an embodiment, strap retractor 550 then retracts retractor strap 540 and thereby retracts the individual (i.e., soldier). In embodiments, the release system includes two releasable attachments. In alternative embodiments, the release system has one releasable attachment or more than two releasable attachments.

Figure 29:
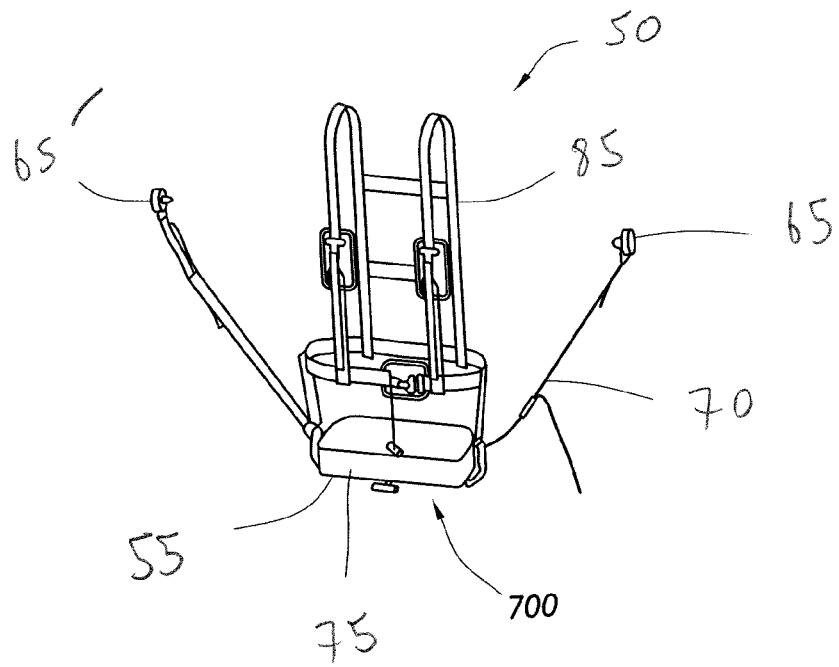
FIG. 29 illustrates a front perspective view of an embodiment of a solider restraint system having a single point release system.
Figure 30:
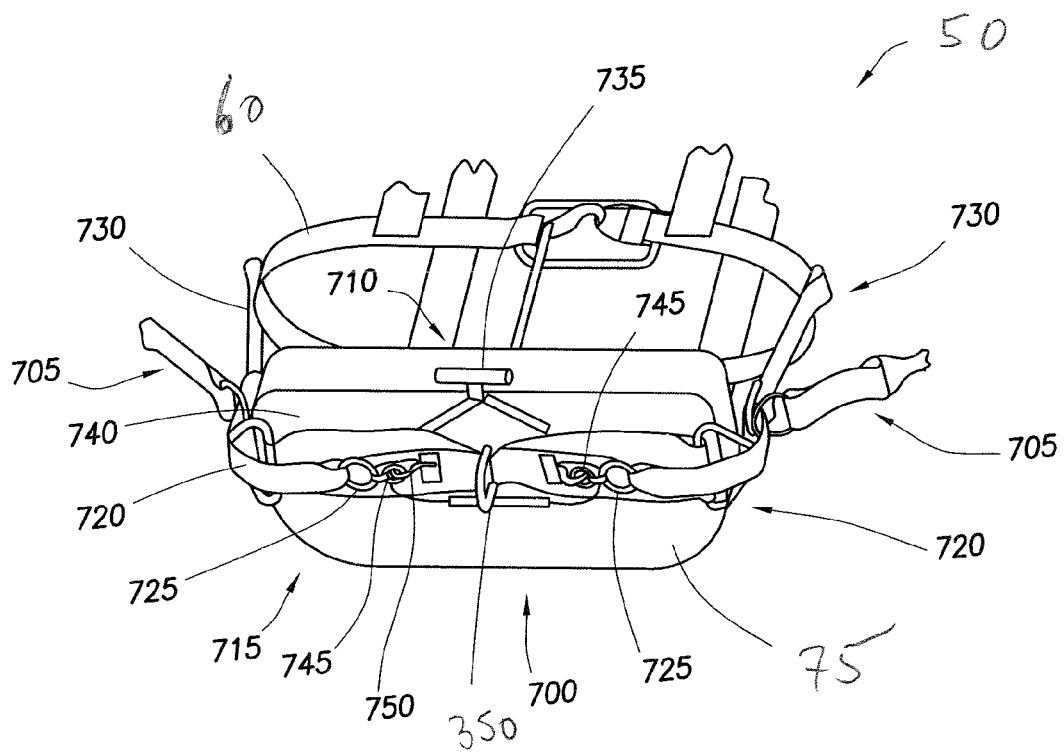
FIG. 30 illustrates a bottom perspective view of an embodiment of a seat, harness belt and single point release system.
Figure 31:
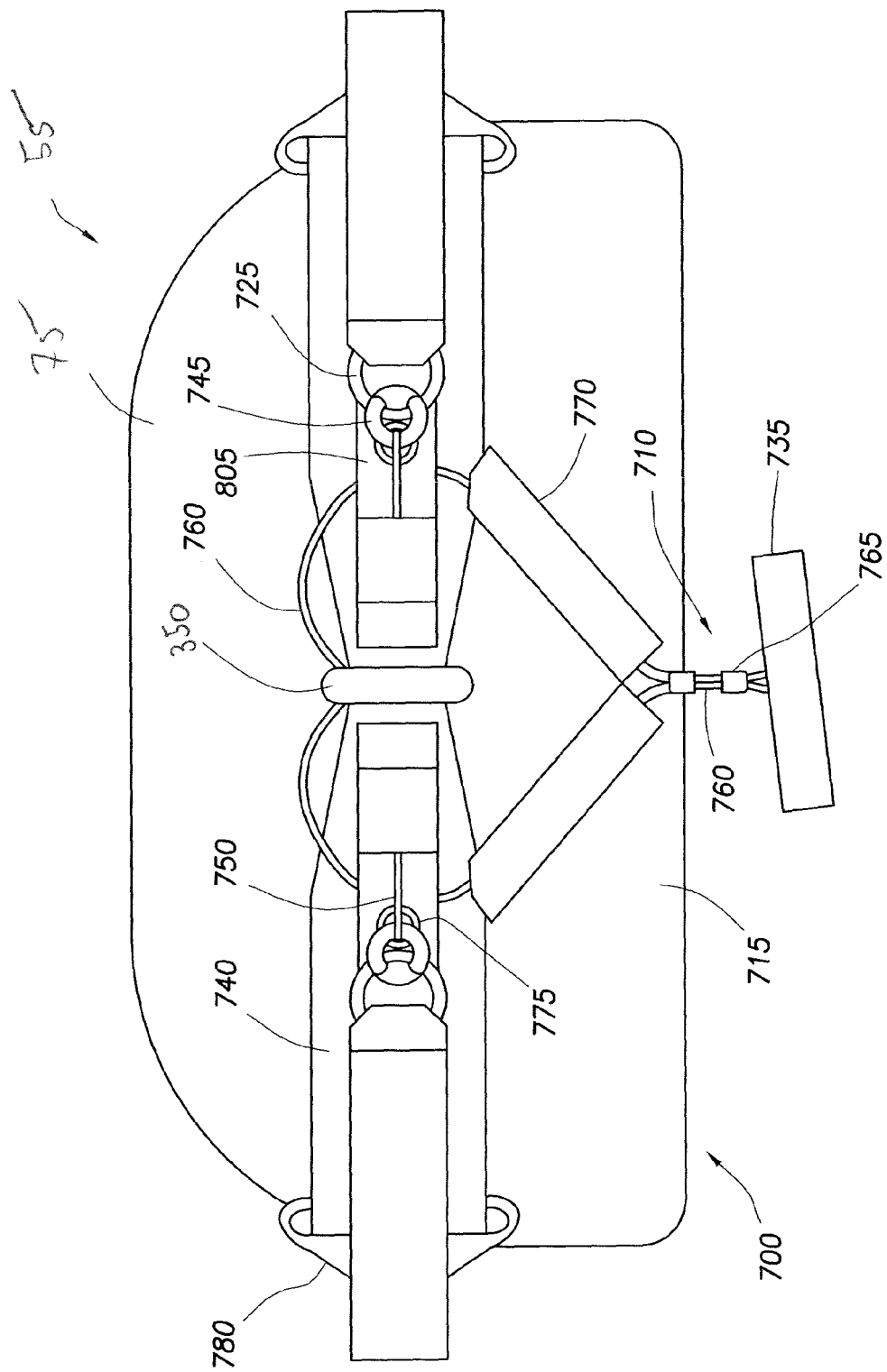
FIG. 31 illustrates a bottom view of an embodiment of a seat and single point release system.

FIG. 29 illustrates an embodiment of soldier restraint system 50 having seat assembly 55, shoulder harness 85, and single point release system 700. As shown in FIGS. 29-31, embodiments of single point release system 700 include seat side straps 705, main support straps 720, side restraint tethers 730, and release assembly 715. Without limitation, single point release system 700 allows a solider disposed in soldier restraint system 50 to separate from seat assembly 55 by actuating only one release mechanism (e.g., release device 710). Further, without limitation, single point release system 700 facilitates egress (i.e., emergency egress) of a soldier from seat assembly 55 and/or sections of the vehicle (or egress from the vehicle).

In an embodiment as shown in FIGS. 29-31, release assembly 715 includes release device 710, release assembly strap 740, large rings 725, small rings 745, and wire catch loops 750. In embodiments as shown, release assembly strap bracket 780 is attached to opposing longitudinal sides of release assembly strap 740. In embodiments, release assembly strap 740 is secured to the underside of seat 75. Release assembly strap 740 is secured to seat 75 by any suitable means such as by sewing, adhesive, tacking, and the like. Single point release system 700 has two main support straps 720, with each main support strap 720 having a large ring 725 disposed at an end. Large ring 725 refers to a ring having any diameter suitable for a small ring 745 to pass therethrough and that remains suitable for use with soldier restraint system 50. Small ring 745 refers to any ring having any diameter suitable for small ring 745 to pass through a large ring 725 and that remains suitable for use with soldier restraint system 50. Single point release system 700 also has two small rings 745 attached to release assembly strap 740 and disposed on opposing sides of base strap attachment means 350 from each other. Small rings 745 may be attached to release assembly strap 740 by small ring flap 805. Small ring flap 805 may include any suitable means for attaching small ring 745 to release assembly strap 740. In an embodiment, small ring flap 805 is webbing.

Figure 32:
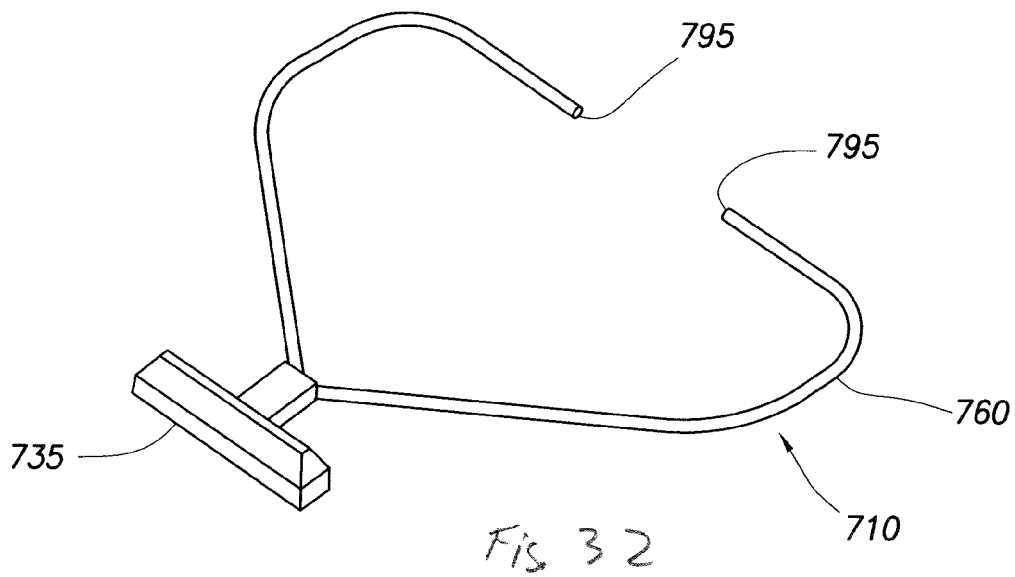
FIG. 32 illustrates an embodiment of a release device.

In embodiments as shown in FIGS. 30-32, release assembly 715 includes release device 710. Release device 710 includes handle 735 and release wire 760. In embodiments as shown, release device 710 has wire ends 795 on the opposing side of release device 710 from handle 735, which in embodiments are unattached to each other. Release wire 760 may be any flexible wire. In embodiments, release wire 760 is a steel braided cable. In some embodiments, release wire 760 is coated with a plastic coating. Without limitation, the coating facilitates prevention of release wire 760 from catching on seat 75. In some alternative embodiments (not illustrated), release assembly 715 includes more than one release device 710. In other alternative embodiments (not illustrated), handle 735 is attached to more than release wire 760. In an alternative embodiment (not illustrated), release wire 760 is attached to more than one handle 735.

In embodiments as shown in FIGS. 30 and 31, release device 710 includes crimps 765. Crimps 765 attach the portions of release wire 760 that are proximate to handle 735 to each other. Crimps 765 refer to any device suitable for attaching the portions of release wire 760 to each other. In an embodiment, release device 710 has wire guides 770 on each portion of release wire 760, with wire guides 770 disposed between crimping 765 and small rings 745. In such an embodiment, a portion of each portion of release wire 760 is disposed within a wire guide 770.

Figure 33:
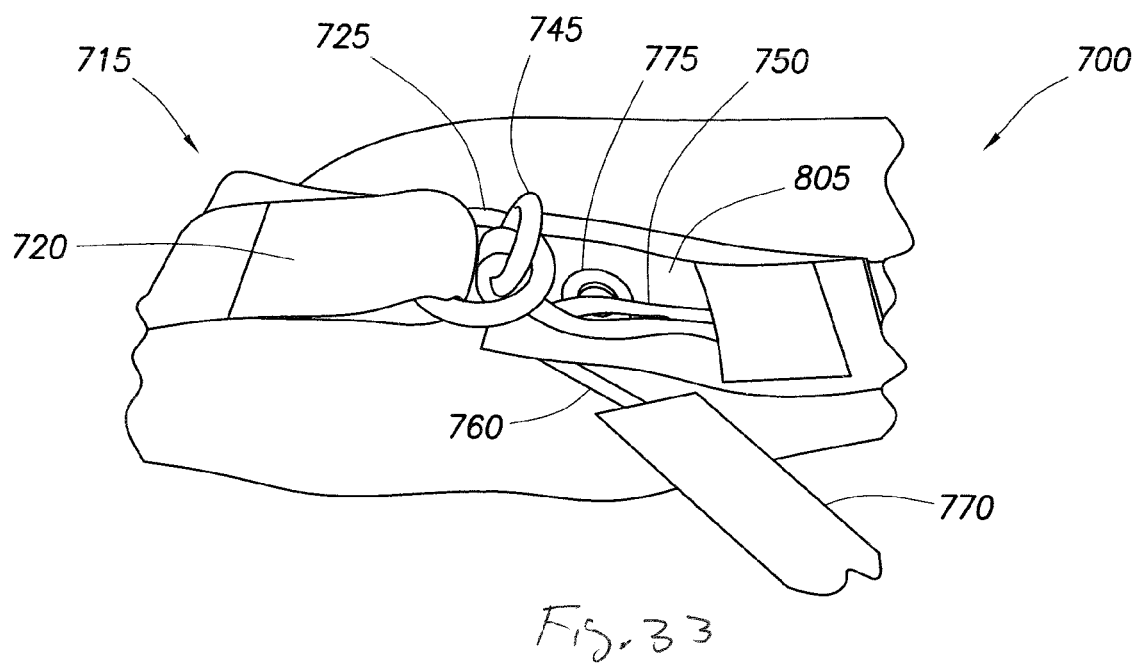
FIG. 33 illustrates a perspective bottom view of an embodiment of a release assembly prior to the wire catch loop passing through the small ring and the large ring.
Figure 34:
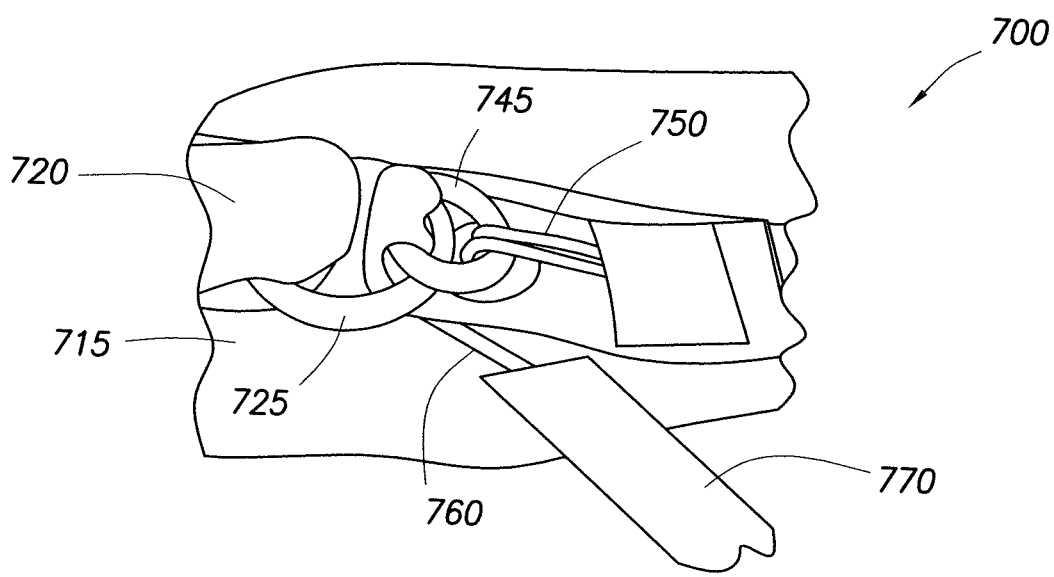
FIG. 34 illustrates a perspective bottom of an embodiment of the release assembly of FIG. 33 with the wire catch loop passing through the small ring and the large ring.

FIG. 33 illustrates an embodiment of single point release system 700 in which wire catch loop 750 has not attached small ring 745 and large ring 725 to each other. FIG. 34 illustrates an embodiment of single point release system 700 in which wire catch loop 750 has attached small ring 745 and large ring 725 to each other.

Figure 35:
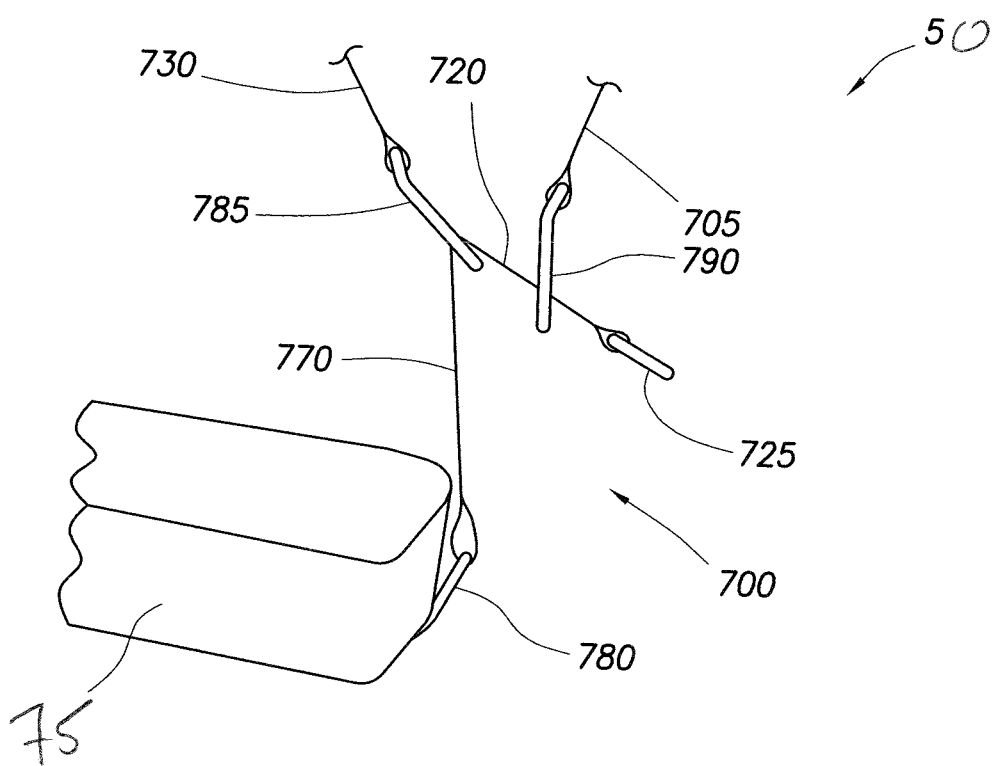
FIG. 35 illustrates a perspective view of an embodiment of main support strap, seat side strap, and side restraint tether attached to each other.

FIG. 35 illustrates an embodiment of single point release system 700 in which main support strap 720, side restraint tether 730, and seat side strap 705 are in a partially subassembled stage before attachment to each other. Side restraint tether 730 has a side restraint tether bracket 785 (i.e., D ring) on an end of side restraint tether 730. Seat side strap 705 has a seat side strap bracket 790 (i.e., D ring) on an end of seat side strap 705.

Figure 36:
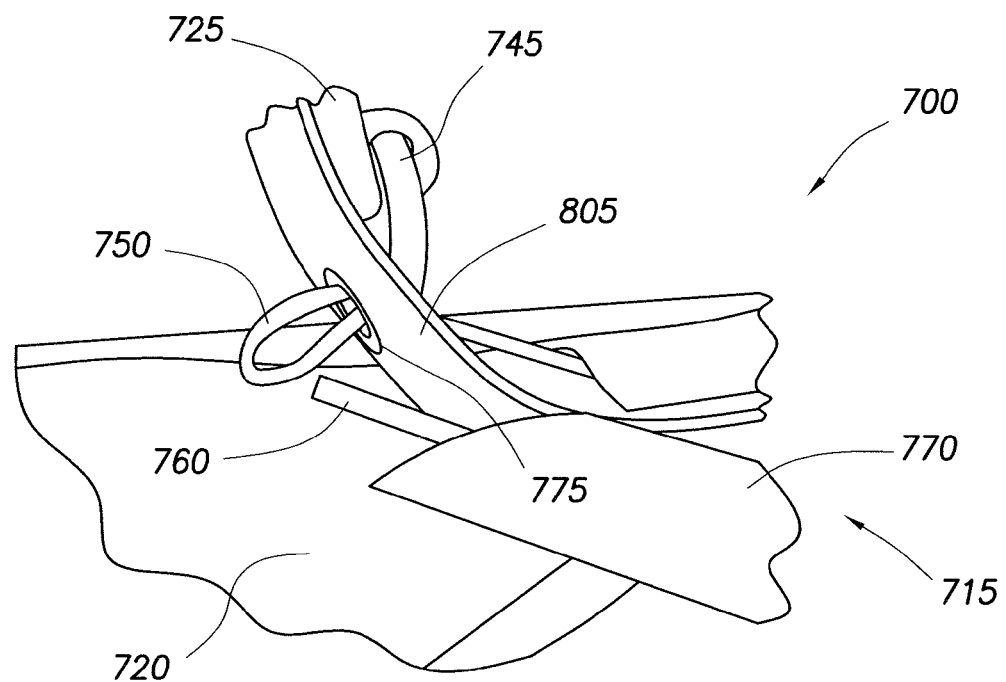
FIG. 36 illustrates an embodiment of the wire catch loop attaching the small ring.
Figure 37:
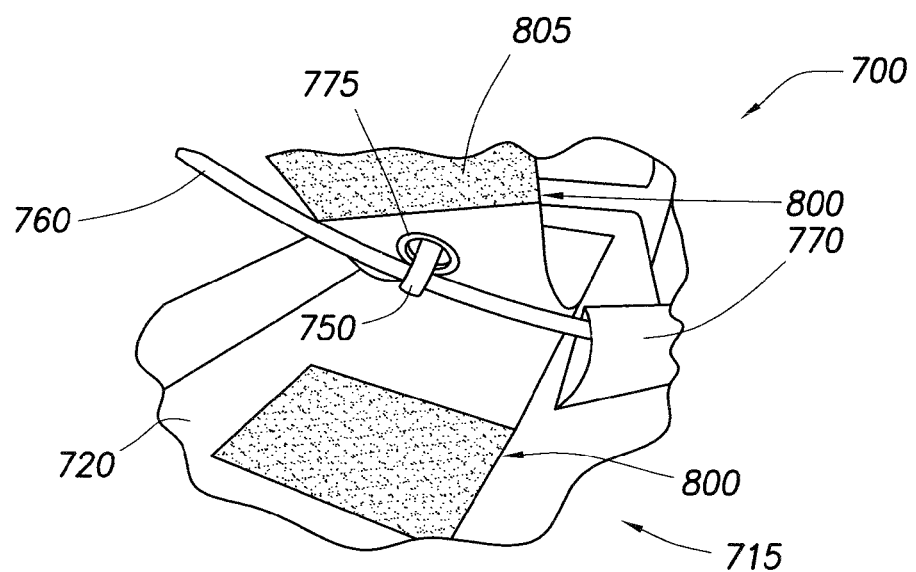
FIG. 37 illustrates an embodiment of the release wire attaching the wire catch loop.

FIG. 36 illustrates an embodiment of release assembly 715 in which wire catch loop 750 has passed through large ring 725, small ring 745, and strap opening 775 (i.e., grommet). In such embodiment, small ring flap 805 has been lifted to facilitate the passing of release wire 760 through wire catch loop 750. FIG. 37 illustrates an embodiment in which release wire 760 has passed through wire catch loop 750. In embodiments, small ring flap 805 includes small ring flap attachment means 800. Small ring flap attachment means 800 may include any means suitable for releasable attachment of an end of small ring flap 805 to release assembly strap 740. In some embodiments, small ring flap attachment means 800 includes a button, pin, VELCRO (i.e., hook and loop system), or the like. In embodiments as shown, small ring flap attachment means 800 is a hook and loop system.

In embodiments of preparation of soldier restraint system 50 for single point release system 700 as shown in FIGS. 29-37, each wire end 795 is fed through a wire guide 770. The end of main support strap 720 with large ring 725 is fed through side restraint tether bracket 785 and seat side strap bracket 790. Main support strap 720 with large ring 725 is then looped underneath seat 75 a sufficient distance to allow small ring 745 to pass through large ring 725. In embodiments, small ring 745 is folded back towards the middle of seat 75. Wire catch loop 750 is then fed through small ring 745 towards seat 75 and then through strap opening 775, with the end portion of wire catch loop 750 then disposed on the opposing side of strap opening 775 from small ring 745 and large ring 725. Release wire 760 is then fed through the end portion of wire catch loop 750 that is disposed on the opposing side of strap opening 775. Small ring flap 805 is then attached to seat 75 by small ring flap attachment means 800. In embodiments, single point release system 700 includes repeating such steps on the opposing longitudinal side of seat 75. After such steps are complete for both longitudinal sides of seat 75, embodiments of single point release system 700 include feeding release wire 760 further through wire guides 770, with wire ends 795 being disposed underneath release assembly strap 740 (i.e., disposed between seat 75 and release assembly strap 740).

In embodiments of operation of single point release system 700 as shown in FIGS. 29-37 after assembly, the soldier or an individual disposed in soldier restraint system 50 may grasp handle 735. The soldier may then pull handle 735 outward and away from seat 75, which pulls release wire 760 out of the end portion of wire catch loop 750. Wire catch loop 750 is then released when release wire 760 is no longer disposed in the end portion of wire catch loop 750, which releases large ring 725 as small ring 745 passes back outward through large ring 725. Large ring 725 (and main support strap 720) may then pass back through seat side strap bracket 790 and side restraint tether bracket 785. The soldier may then be released from seat 75. In embodiments, preparation of soldier restraint system 50 for single point release system 700 may then proceed as disclosed in embodiments herein.

The vehicle in which wall rail platform system 5 is disposed may include any vehicle such as a truck, car, military vehicle, helicopter, air plane, and the like. In an embodiment, the vehicle is a military vehicle. Any type of military vehicle may be used. In embodiments, the military vehicle is an ambulance.

It is to be understood that wall rail platform system 5 is not limited to soldiers but may be used for any type of individual.

Although the present invention and its advantages have been described in detail, it should be understood that various changes, substitutions and alterations may be made herein without departing from the spirit and scope of the invention as defined by the appended claims.

What is claimed is:

1. A wall rail platform system disposed in a vehicle, comprising:
   a collapsible platform, wherein the collapsible platform comprises a position, and wherein the position comprises a collapsed position or an un-collapsed position;
   a rail;
   an energy attenuation device, wherein the energy attenuation device is disposed between the rail and a floor of the vehicle;
   a carriage, wherein the carriage is attached to the collapsible platform, and wherein the carriage is vertically moveable along the rail; and
   a soldier restraint system, comprising:
      a seat assembly;
      an angle sensor mechanism; and
      a single point release system.

2. The wall rail platform system of claim 1, wherein the collapsible platform comprises a base portion and a collapsible base portion.

3. The wall rail platform system of claim 2, wherein the base portion and the collapsible base portion are attached to each other.

4. The wall rail platform system of claim 2, wherein the collapsible base portion is disposed upon the base portion when the collapsible platform is in the collapsed position.

5. The wall rail platform system of claim 2, wherein the un-collapsed position comprises the base portion and the collapsible base portion, wherein the base portion and the collapsible base portion create a horizontal surface.

6. The wall rail platform system of claim 1, wherein the carriage is vertically moveable up and down along the rail.

7. The wall rail platform system of claim 6, wherein the carriage comprises a pull handle, and wherein actuation of the pull handle allows for vertical movement of the carriage along the rail.

8. The wall rail platform system of claim 7, wherein the carriage is securable to the rail at a plurality of vertical positions.

9. The wall rail platform system of claim 6, wherein the carriage comprises rollers.

10. The wall rail platform system of claim 9, wherein the rail comprises roller guides, and wherein the rollers are disposed in the roller guides.

11. The wall rail platform system of claim 1, wherein the rail, collapsible platform, and carriage rotate about a vertical axis.

12. The wall rail platform system of claim 11, further comprising a foot pedal.

13. The wall rail platform system of claim 12, wherein actuation of the foot pedal allows for rotational movement of the rail, collapsible platform, and the carriage.

14. The wall rail platform system of claim 12, further comprising a support plate, wherein the rail is disposed upon the support plate.

15. The wall rail platform system of claim 14, wherein the support plate comprises a plurality of support plate openings.

16. The wall rail platform system of claim 11, further comprising a hand pin.

17. The wall rail platform system of claim 16, wherein actuation of the hand pin allows for rotational movement of the rail, collapsible platform, and the carriage.

18. The wall rail platform system of claim 1, wherein the single point release system comprises:
- a release assembly;
- a first seat side strap and a second seat side strap;
- a first main support strap and a second main support strap; and
- a first side restraint tether and a second side restraint tether.

19. The wall rail platform system of claim 18, wherein actuation of the release assembly allows an individual disposed in the seat assembly to be separated from the seat assembly.

* * * * *